(12) United States Patent
Leonard et al.

(10) Patent No.: US 12,196,914 B2
(45) Date of Patent: Jan. 14, 2025

(54) RAIN SENSOR

(71) Applicant: UNDERSTORY, INC., Madison, WI (US)

(72) Inventors: John P. Leonard, Cambridge, WI (US);
Kyle Z. Jero, McFarland, WI (US);
Bryan A. Dow, Monona, WI (US);
Eric J. Hewitt, Danville, VT (US)

(73) Assignee: UNDERSTORY, INC., Madison, WI (US)

( * ) Notice: Subject to any disclaimer, the term of this patent is extended or adjusted under 35 U.S.C. 154(b) by 585 days.

(21) Appl. No.: 16/674,791

(22) Filed: Nov. 5, 2019

(65) Prior Publication Data

US 2020/0142099 A1 May 7, 2020

Related U.S. Application Data

(60) Provisional application No. 62/756,363, filed on Nov. 6, 2018.

(51) Int. Cl.
| | | |
|---|---|---|
| *G01W 1/14* | (2006.01) | |
| *G01H 11/08* | (2006.01) | |
| *G01J 1/42* | (2006.01) | |
| *G01W 1/02* | (2006.01) | |
| *G01W 1/08* | (2006.01) | |

(Continued)

(52) U.S. Cl.
CPC ............ *G01W 1/14* (2013.01); *G01H 11/08* (2013.01); *G01J 1/42* (2013.01); *G01W 1/02* (2013.01); *G01W 1/08* (2013.01); *G01W 1/10* (2013.01); *H04R 19/016* (2013.01); *G01J 2001/4285* (2013.01)

(58) Field of Classification Search
CPC .......... G01W 1/14; G01W 1/02; G01W 1/08; G01W 1/10; G01H 11/08; G01J 1/42; G01J 2001/4285; H04R 19/016
See application file for complete search history.

(56) References Cited

U.S. PATENT DOCUMENTS

| | | | |
|---|---|---|---|
| 3,110,867 A | | 11/1963 | Flowers |
| 5,420,592 A | * | 5/1995 | Johnson .................. G01S 19/35 |
| | | | 342/357.46 |

(Continued)

FOREIGN PATENT DOCUMENTS

| | | | | |
|---|---|---|---|---|
| CN | 108648764 A | * | 10/2018 | .............. G01W 1/14 |
| FR | 2885420 A1 | | 11/2006 | |

(Continued)

OTHER PUBLICATIONS

Madden et al., Calibration and evaluation of an electronic sensor for rainfall kinetic energy, Phytopathology 88: 950 (1998).

(Continued)

*Primary Examiner* — Seung C Sohn
(74) *Attorney, Agent, or Firm* — Casimir Jones, S.C.; Brian F. Bradley; Thomas A. Isenbarger

(57) ABSTRACT

Provided herein is technology relating to measuring weather data and particularly, but not exclusively, to apparatuses, methods, and systems for sensing hydrometeors (e.g., rain) and measuring hydrometeor characteristics (e.g., volume, rate, size distribution, etc.).

23 Claims, 23 Drawing Sheets

(51) Int. Cl.
*G01W 1/10* (2006.01)
*H04R 19/01* (2006.01)

(56) References Cited

U.S. PATENT DOCUMENTS

| | | | |
|---|---|---|---|
| 6,421,010 B1 * | 7/2002 | Chadwick | G01S 3/48 |
| | | | 342/465 |
| 6,708,133 B1 | 3/2004 | Hallet et al. | |
| 6,892,580 B2 | 5/2005 | Pankey et al. | |
| 7,249,502 B2 | 7/2007 | Luukkala et al. | |
| 7,286,935 B2 | 10/2007 | Aspola et al. | |
| 8,448,507 B2 | 5/2013 | Salmi et al. | |
| 9,244,192 B2 | 1/2016 | Cullen et al. | |
| 9,304,226 B2 * | 4/2016 | Berheide | G01V 5/107 |
| 9,846,092 B2 | 12/2017 | Kubicek et al. | |
| 9,958,346 B2 | 5/2018 | Kubicek et al. | |
| 2005/0016275 A1 | 1/2005 | Pankey et al. | |
| 2007/0288235 A1 | 12/2007 | Vaananen et al. | |
| 2016/0327687 A1 | 11/2016 | Nylander et al. | |
| 2017/0261647 A1 | 9/2017 | Wolf et al. | |

FOREIGN PATENT DOCUMENTS

| | | |
|---|---|---|
| JP | S63 262582 A | 10/1988 |
| JP | 2005-504298 | 2/2005 |
| WO | WO 2013147605 | 10/2013 |
| WO | WO 2020097082 | 5/2020 |

OTHER PUBLICATIONS

Förster et al., A Piezoelectrical Rain Gauge for Application on Buoys, Journal of Atmospheric and Oceanic Technology 21: 179-193 (2004).

Sirohi, et al., Fundamental understanding of piezoelectric strain sensors, Journal of Intelligent Material Systems and Structures 11: 246-257 (2000).

Mikhaylovskaya, Theory of measuring the size of raindrops by acoustic method. Soviet Hydrol. Selected Papers, No. 1, 85-90. (1964).

Kinnell, The Acoustic Measurement of Water-Drop Impacts, Journal of Applied Meteorology 11: 691-694 (1972).

Nystuen, Temporal Sampling Requirements for Automatic Rain Gauges, Journal of Atmospheric and Oceanic Technology 15: 1253-1260(1998).

Paritsky et al., Fiber optic microphone as a realization of fiber optic positioning sensors Proceedings of the International Society for Optical Engineering (SPIE). 10th Meeting on Optical Engineering in Israel. 3110: 408-09 (1997).

Oppenheim et al., Signals and Systems, Prentice-Hall, Inc. (1983) (TOC).

Ulbrich, Natural variations in the analytical form of the raindrop size distribution Journal of Applied Meteorology and Climatology, 22(10): 1764-1775 (1983).

International Search Report issued Jan. 16, 2020 for corresponding International Application No. PCT/US2019/059873, 19 pages.

Office Action for JP 2021-525059, mailed Aug. 23, 2022, 3 pages.

Extended European Search Report for EP 19881099.6, mailed Sep. 28, 2022, 10 pages.

Willmot, Elena et al. Examples of ground-based hail, rain, and wind sensor networks operating in real-time. 2017 IEEE International Geoscience and Remote Sensing Symposium (IGARSS), IEEE, Jul. 23, 2017, pp. 5987-5989.

* cited by examiner

RAIN SENSOR

This application claims priority to U.S. provisional patent application Ser. No. 62/756,363, filed Nov. 6, 2018, which is incorporated herein by reference in its entirety.

FIELD

Provided herein is technology relating to measuring weather data and particularly, but not exclusively, to apparatuses, methods, and systems for sensing hydrometeors (e.g., rain) and measuring hydrometeor characteristics (e.g., volume, rate, size distribution, etc.).

BACKGROUND

Weather data are used by numerous entities such as government agencies and a variety of industries for analysis and informational purposes. For example, some industries that typically require accurate weather data include power traders, utility companies, insurance agencies, agriculture, and research institutions. Moreover, accurate data are critical for weather forecasting and meteorology, as well as for alternative energy planning and/or monitoring. In particular, collecting data related to hydrometeors (e.g., rain) is important for food production, loss prevention, climate study, and urban planning.

Many different rain sensor technologies have been developed. These sensors vary in their detection mechanism as well as their resolution and accuracy. At a general level, the main types of rain sensors either physically collect raindrops to measure accumulated water volume or weight directly or measure individual hydrometeor impacts and calculate aggregate accumulation. A common type of rain sensor is a rain gauge, e.g., a waterproof collection receptacle having a known cross-sectional area that is used to collect rainfall. A disadvantage of a rain gauge is that it requires a user to read accumulated rainfall and to empty it after each rain event. While these actions can be automated with sensors and actuation, such technologies require moving parts. One type of automated rain sensor is a tipping bucket rain gauge, which is a type of rain gauge in which collected water is funneled into a separate receptacle that tips, empties, and resets once a known amount of rainfall has occurred. Each tip is counted to provide a measure of total rain volume. While automated, the shortcomings of the tipping bucket include accuracy, installation, and long-term maintenance. Further, performance of the tipping bucket receptacles is impacted by mechanical issues (e.g., dirty or frozen bearings and clogged inlet funnels caused by animals or dead plant material) that can prevent tipping or that cause "false" tips to be counted in the absence of rain or complete filling.

Additionally, disdrometers capture information on individual hydrometeors and can differentiate between different types of hydrometeors. The most common disdrometers use a photogate or related optical technique to identify the size and velocity of individual hydrometeors and compute the rain rate over an amount of time. Some disdrometers compute other parameters such as snowfall rate, mixed precipitation characteristics, and can identify graupel or hailstones. However, they require excessive power to and are expensive.

Some technologies comprise use of a piezoelectric device to measure the kinetic energy of rain drops. See, e.g., Madden, Phytopathology 88: 950 (1998); Förster, Journal of Atmospheric and Oceanic Technology 21: 179 (2004). However, piezoelectric devices require physically attaching the piezoelectric component to a detection plate. Accordingly, the performance of the rain gauge depends both on the method of attachment and on the specifications of the other components. In these technologies, the dynamic response of the piezoelectric sensor is greatly influenced by direct attachment to a surface. In particular, attaching the piezoelectric component to a surface, e.g., using adhesive, fusing, or bolting, affects the "spring" and "damper" dynamic relations between the sensor and the detection surface area. Consequently, the complexities of these relationships have to be taken into account. For example, corrections in measurements using piezoelectric elements are often made to account for Poisson's Ratio Effect and Shear Lag Effect. See, e.g., Sirohi, Journal of Intelligent Material Systems and Structures 11: 246 (2000). Further, piezoelectric materials are temperature dependent, which introduces errors into measurements of rain while in use in a recording environment experiencing changes in temperature. Piezoelectric devices can exhibit up to a 50% change in capacitance over their range of operation and, consequently, devices comprising piezoelectric elements have additional components and complexity to correct for these variations and thus have increased failure modes.

Some technologies mechanically link a transducer to an impact target for measuring rain drop impacts. See, e.g., Mikhaylovskaya, Sov. Hydrol. Selected Papers 1: 85-90 (1964). In some other technologies, acoustic signals are transmitted through a fluid (e.g., liquid or air) to a transducer. See, e.g., Kinnell, Journal of Applied Meteorology 11: 691 (1972). These instruments are limited to measurements of low rainfall intensities, exhibit position-dependent sensor sensitivities, and suffer errors from variations in drop velocity and angle of impact caused by wind currents. Additional technologies comprising detection of acoustic signals to detect individual raindrop impacts include those described, e.g., in U.S. Pat. Nos. 7,249,502; 7,286,935; 8,448,507; 6,892,580; 9,244,192; and U.S. Pat. App. Pub. No. 2016/0327687.

Nystuen tested weighing, capacitance, tipping-bucket, optical, disdrometer, and acoustical rain gauges over a 17-month collection time. Nystuen, Journal of Atmospheric and Oceanic Technology 15: 1253 (1998); Nystuen, Journal of Atmospheric and Oceanic Technology 16: 1025 (1998). Each of the rain gauges tested had measurement flaws (e.g., resulting from biological fouling, lapses in measurement due to requirements for recalibration, and seasonal variability) and exhibited limitations (e.g., nondetection of small drops, noisy data, underestimation of high rainfall rates, overestimation of rainfall rates, high variability, and errors caused by wind). Further, in the 1998 Nystuen study, the rain gauges required sampling at a low (10%) duty cycle to limit power consumption so that multi-month recording could occur.

Accordingly, collection of hydrometeor (e.g., rain) data would benefit from improved technology.

SUMMARY

Provided herein are embodiments of an automated hydrometeor sensor. In some embodiments, the technology provides a device and/or apparatus that has no moving parts and that does not comprise a piezoelectric component. Thus, in some embodiments, the technology comprises "piezoelectric component-free" embodiments.

In some embodiments, the technology provides a device and/or apparatus that does not comprise a sensing element attached to a surface impacted by rain (e.g., as in some devices comprising a piezoelectric element). Thus, in some embodiments, the technology comprises "surface-attached sensor-free" embodiments.

In some embodiments, the technology comprises use of an electret microphone that does not require phantom power. Accordingly, in some embodiments, the technology does not comprise a condenser microphone (e.g., a microphone that requires phantom power). Thus, in some embodiments, the technology comprises "condenser microphone-free" embodiments.

In various embodiments, the technology has a lower cost than comparable technologies and needs minimal or no maintenance. In some embodiments, the hydrometeor sensor technology is integrated with a wind sensor, e.g., to correct determinations of hydrometeor characteristics (e.g., hydrometeor mass, hydrometeor size, hydrometeor volume, accumulated hydrometeor mass or volume, hydrometeor impact velocity, hydrometeor impact force, hydrometeor impact angle, hydrometeor impact momentum). In some embodiments, the hydrometeor sensor technology is integrated with a hail sensor, e.g., to correct determinations of non-hail (e.g., rain drop) characteristics (e.g., drop mass, drop size, drop volume, accumulated drop mass or volume, drop impact velocity, drop impact force, drop impact angle, drop impact momentum).

Accordingly, provided herein is a technology for detecting rain and/or determining a rain rate. For example, in some embodiments, the technology provides a rain sensing apparatus comprising a hollow sonde; and a transducer. In some embodiments, the rain sensing apparatus further comprises a stalk upon which is mounted said transducer.

The technology is not limited in the shape of the sonde. In some embodiments, the sonde is a sphere. However, the technology is not limited to a sonde that is a sphere and includes embodiments comprising a sonde of any shape. For example, the technology comprises embodiments in which a sonde is essentially, substantially, or functionally a sphere. In some embodiments, the sonde is an ellipsoid, a spheroid, a toroid, a disc, a prism, a conical section, a portion of a sphere or spheroid, or a portion or section of any of the foregoing (e.g., a half-sphere, etc.) In some embodiments, a portion of the sonde is removed and replaced with another component (e.g., a cone component (e.g., comprising a "drum head" component and a cone body that tunnels sound to the transducer)).

The technology is not limited in the material from which the sonde is made. In some embodiments, the sonde is made of a metal that provides the "bell-like" attributes of the sonde as discussed herein (e.g., steel, stainless steel, aluminum, copper, bronze, tin, a metal alloy, etc.)

In some embodiments, the sonde has a diameter of from 100 to 500 mm (e.g., 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 mm). In some embodiments, the sonde shell is 0.5 to 5 mm (e.g., 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mm) thick. In some embodiments, the sonde has a characteristic frequency of 6 to 10 kHz (e.g., 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz).

In some embodiments, the transducer is an electret, piezo, or condenser microphone. In some embodiments, the technology comprises a piezoelectric component but the piezoelectric component is not in direct contact with any surface of a structure or component upon which hydrometeors impact. That is, in some embodiments comprising a piezoelectric component, the piezoelectric component is separated from the structure or component upon which hydrometeors impact by an air gap or similar gap. In some embodiments comprising a piezoelectric component, the piezoelectric component detects sound waves propagated through a non-solid (e.g., gas) from a component upon which hydrometeors impact to the piezoelectric component.

In some embodiments, the transducer is placed approximately 20 to 80 mm (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mm) away from (e.g., above, below, to the side of, etc.) the center of the sonde. In some embodiments, the transducer is placed on the vertical axis of the sonde. In some embodiments, the transducer is placed approximately 25 to 75 mm (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 mm) away from (e.g., above, below, to the side of, etc.) the center of the sonde.

In some embodiments, the microphone is placed at a position within the sonde that is measured relative to the size (e.g., diameter (D) and/or the radius (R)) of the sonde. Accordingly, in some embodiments the microphone is placed at a position that is on the vertical axis of the sonde and is positioned at a distance that is approximately $0.05 \times D$ to $0.95 \times D$ above the sonde center (e.g., a distance that is approximately 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or $0.95 \times D$ above the sonde center). In some embodiments the microphone is placed at a position that is on the vertical axis of the sonde and is positioned at a distance that is approximately $0.2 \times D$ to $0.8 \times D$ above the sonde center (e.g., a distance that is approximately 0.2, 0.25, 0.3, 0.35, 0.4, 0.45, 0.5, 0.55, 0.6, 0.65, 0.7, 0.75, $0.8 \times D$ above the sonde center). In some embodiments the microphone is placed at a position that is on the vertical axis of the sonde and is positioned at a distance that is approximately $0.3 \times D$ to $0.7 \times D$ above the sonde center (e.g., a distance that is approximately 0.3, 0.35, 0.4, 0.45, 0.5, 0.55, 0.6, 0.65, $0.7 \times D$ above the sonde center). In some embodiments, the microphone is not placed on the vertical axis of the sonde, e.g., in some embodiments the microphone is placed approximately $0.05 \times D$ to $0.95 \times D$ away from the sonde center (e.g., a distance that is approximately 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or $0.95 \times D$ away from the sonde center in any direction).

In some embodiments, the sonde comprises a limited rain-sampling area (e.g., in some embodiments, the sonde comprises a cone element comprising a "drum head" and a cone that tunnels sound to the transducer). In some embodiments, the apparatus further comprises a solar radiance sensor.

Further provided are embodiments of methods. For example, in some embodiments, the technology provides a method of determining a rain rate, the method comprising providing an apparatus as described herein (e.g., comprising a hollow sonde and transducer); acquiring a real-time acoustic signal of rain drops impacting the sonde of said apparatus; processing said real-time acoustic signal to produce acoustic power data or acoustic energy data; and determining a rain rate from the acoustic power data or acoustic energy data. In some embodiments, determining a rain rate from the acoustic power data or acoustic energy data comprises producing a statistical parameter from a distribution of acoustic power data or acoustic energy data. In some embodiments, processing the real-time acoustic signal comprises sampling an analog voltage to produce a digital time varying signal. In some embodiments, processing the real-time acoustic signal comprises demodulating an amplitude modulated signal. In some embodiments, processing said real-time acoustic signal comprises applying an envelope to the digital time varying signal. In some embodiments, processing said real-time acoustic signal comprises downsampling the digital time varying signal. In some embodiments, determining a rain rate from the acoustic power data or acoustic energy data comprises using a correlation between the aggregate signal of multiple droplet strikes and rain rate. In some embodiments, determining a rain rate from the acoustic power data or acoustic energy data comprises using a power function to correlate between the aggregate signal of multiple droplet strikes and rain rate.

In some embodiments, methods further comprise normalizing the acoustic power and/or acoustic energy detected by an apparatus as described herein. In some embodiments, normalizing the acoustic power and/or acoustic energy detected by an apparatus as described herein uses an empirical measurement of the acoustic power and/or acoustic energy in a normal rain (e.g., having a maximum drop size of approximately 4.0 or 5.0 mm in diameter (e.g., having a distribution of drop sizes between approximately 0.5 mm and 4.0 or 5.0 mm in diameter (e.g., a diameter of approximately 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mm))). In some embodiments, normalizing the acoustic power data and/or acoustic energy data uses a normalization constant based on the maximum microphone signal detected in a normal rain. In some embodiments, methods comprise correcting the acoustic power data and/or acoustic energy data for wind velocity (e.g., as detected by a weather-sensing device as described in U.S. Pat. Nos. 9,846,092 and 9,958,346, each of which is incorporated herein in its entirety).

Further embodiments relate to systems comprising a plurality of rain sensing devices as described herein (e.g., comprising a sonde and a transducer).

Some embodiments relate to use of an apparatus comprising a sonde and transducer to detect rain (e.g., rain rate, rain accumulation).

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
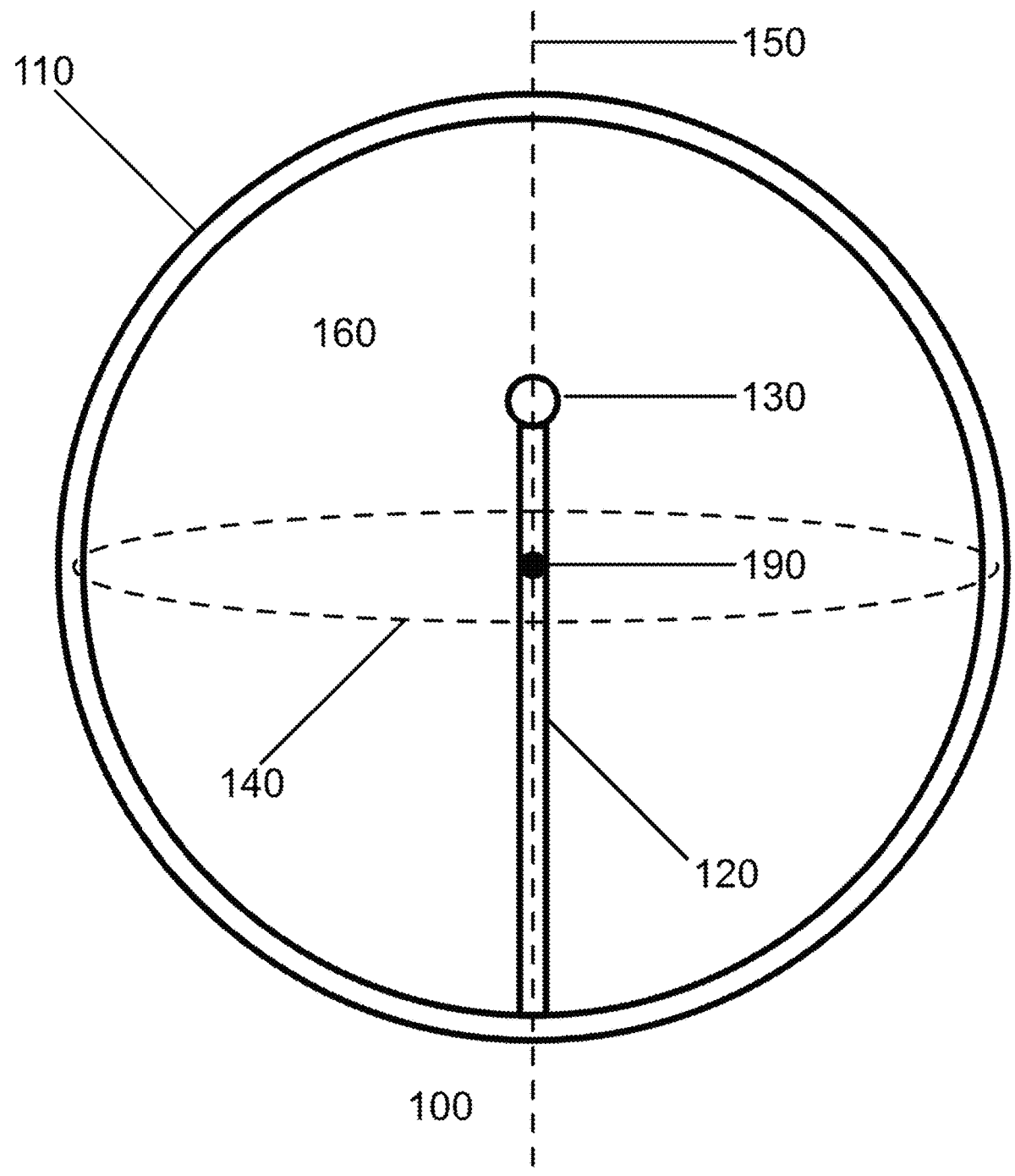
FIG. 1 is a schematic drawing of an embodiment of a rain-sensing apparatus 100 as described herein, e.g., comprising a sonde 110 and a microphone 130 on a stalk 120 inside a volume 160 inside the sonde.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to measuring weather data and particularly, but not exclusively, to apparatuses, methods, and systems for sensing hydrometeors (e.g., rain) and measuring hydrometeor characteristics (e.g., volume, rate, size distribution, etc.).

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein the term "rain volume" refers to a volume of rain. In some embodiments, a rain volume is an absolute measure of volume (e.g., expressed in units of volume). In some embodiments, a rain volume is expressed as a function of another measurement (e.g., volume per unit time, volume per unit of surface area). Rain volume expressed in units of volume per surface area are simplified in some embodiments to a one-dimensional measurement of rain accumulation, e.g., as provided by a conventional rain gauge. In some embodiments, this measurement is the vertical height of rainfall column on a flat-bottom vessel.

As used herein, the term "rain rate" or "rain intensity" refers to a volume of rain impacting a surface as a function of time. In some embodiments, a rain rate is an instantaneous measurement of rain rate at a discrete time. In some embodiments, a rain rate is a summed (e.g., integrated) measure of total rain accumulation over a specified time interval. In some embodiments, a rain rate is an averaged measure of rain accumulation over a specified time interval.

As used herein, the term "rain size distribution" (or "drop size distribution" or similar) refers to a distribution of rain drop sizes for rain drops impacting a surface during a specified time period. In some embodiments, the measurements of drop size distribution comprises counting drops and placing them into categories or bins based on volume, size (e.g., diameter), and/or mass. As used herein, the term "disdrometry" or "disdrometric" refer to the size distribution of hydrometeors (e.g., rain drops).

As used herein, the term "weldment" refers to a component constructed from an assembly of smaller components, e.g., that are joined by welding the smaller components.

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

As used herein, an "increase" or a "decrease" refers to a detectable (e.g., measured) positive or negative change in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "rain event" is a weather condition leading to precipitation, preferably measurable precipitation. For example, in some embodiments, the term "rain event" refers to hydrometeor impacts (e.g., rain) incident on embodiments of the devices described herein, but is not limited to hydrometeor impacts (e.g., rain) impacts and thus includes other weather-related forces and phenomena.

As used herein, the term "weather data" refers to any measurable or quantifiable weather or meteorological condition or phenomena, such as, for example, rainfall, precipitation, temperature, wind speed, cloudiness, barometric pressure, snowfall, sleet, hail, and ice.

As used herein, the term "precipitation levels" refers to any amount of water, from any source, preferably atmospheric weather, such as rain, sleet, snow, and hail, for example. Precipitation is generally related to rainfall, and is calculated, in some embodiments, using algorithms, interpolations, and other calculations known to one skilled in the art and as described herein.

As used herein, the term "real-time" refers to the time in which reporting of events or recording (e.g., "acquiring") of events is simultaneous (or substantially or effectively simultaneous) with the event or occurring at the same time (or substantially or effectively at the same time) as another event and/or occurrence.

As used herein, the term "acoustic power" or "P-acoustic" or "$P_a$" refers to the instantaneous value (in counts) of the demodulated acoustic signal recorded by a transducer (e.g., a microphone).

As used herein, the term "P-value" refers to the peak acoustic power (in counts) derived from the acoustic signal produced by a single hydrometeor (e.g., a single rain drop). The acoustic power recorded for a single hydrometeor has a signature shape that typically comprises a sharp spike in the acoustic power up to the peak value (P-value) followed by an exponential decay.

As used herein, the term "acoustic energy" or "$E_a$" refers to integrated acoustic power occurring over a specific time range.

DESCRIPTION

Provided herein is technology relating to measuring weather data and particularly, but not exclusively, to apparatuses, methods, and systems for sensing hydrometeors (e.g., rain) and measuring individual and bulk hydrometeor characteristics (e.g., volume, rate, size distribution, etc.) Although the disclosure herein refers to certain illustrated embodiments, it is to be understood that these embodiments are presented by way of example and not by way of limitation.

Rain Sensing Apparatus

In some embodiments, the technology relates to a rain-sensing apparatus comprising a sonde, a stalk, and a microphone. In some embodiments, the technology relates to a rain sensor as shown in FIG. 1, e.g., comprising a sonde 110, a stalk 120, and a microphone 130.

In some embodiments, the sonde is a sphere. In some embodiments, the sonde is hollow. However, the technology is not limited to a sonde that is a sphere and includes embodiments comprising a sonde of any shape. For example, the technology comprises embodiments in which a sonde is essentially, substantially, or functionally a sphere. In some embodiments, the sonde is an ellipsoid, a spheroid, a toroid, a disc, a prism, a conical section, a portion of a sphere or spheroid, or a portion or section of any of the foregoing (e.g., a half-sphere, etc.)

In some embodiments, the sonde is made of steel (e.g., stainless steel). In some embodiments, the sonde is made of another metal (e.g., aluminum, copper, bronze, tin, a metal alloy, etc.) In some embodiments, the material is chosen to provide acoustic, sonic (e.g., bell-like) characteristics to the sonde. For example, in some embodiments, the material is chosen to produce sounds of a particular frequency and/or range of frequencies when impacted by a hydrometeor (e.g., rain).

In particular embodiments (e.g., embodiments comprising a spherical sonde), the sonde has a center and axes passing through the center. Terms known in the art for spherical geometry apply to embodiments comprising spherical sondes. For example, a geodesic connects two points on the surface of the sphere. A great circle (or orthodrome), of a sphere is the intersection of the sphere and a plane that passes through the center point of the sphere. A great circle is the largest circle that can be drawn on any given sphere. Any diameter of any great circle coincides with a diameter of the sphere, and therefore all great circles have the same center and circumference as each other.

In particular embodiments, the spherical sonde has a vertical axis (e.g., an axis aligned with a gravity vector (e.g., an axis passing through the center of the sphere and essentially passing through the center of the Earth)). An equator is a particular great circle that is perpendicular to the vertical axis. As used herein, the "Z dimension" or "Z axis" as defined with respect to a sphere is defined by (e.g., is coincident with and/or is parallel to) the vertical axis of a spherical sonde. FIG. 1 shows an embodiment of a rain sensing apparatus 100 comprising a sonde 110, a stalk 120, and a microphone 130. The vertical axis 150, which passes through the center 190, and the equator 140 are also shown for reference.

In some embodiments, the sonde is hollow. Accordingly, in some embodiments, the sonde comprises a "shell" having a thickness and defining an internal volume 160. Further, the shell separates the internal volume 160 from the external environment. In some embodiments, the shell has a thickness of approximately 0.5 mm to 5 mm (e.g., approximately 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mm). In some embodiments, the shell has a diameter of approximately 100 to 500 mm (e.g., 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 mm). The technology is not limited by this range of diameters and thicknesses and contemplates other diameters and thicknesses that operate according to the principles discussed herein.

For example, embodiments provide that the sonde produces a sound having a characteristic frequency when impacted by a hydrometeor (e.g., rain). In some embodiments, the sonde produces a characteristic frequency when impacted by a rain drop that is in the range from 6 kHz to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz). In some embodiments, the characteristic frequency is a function of the material, diameter (e.g., volume), and shell thickness of the sonde. In some embodiments, the characteristic frequency is a function of environmental variables such as temperature, atmospheric pressure, humidity, composition of the atmosphere, composition of impacting hydrometeors, phase of impacting hydrometeors (e.g., liquid rain or solid hail or sleet, etc.)

The rain sensing apparatus further comprises a transducer that converts sound into an electrical signal, e.g., a sensor of acoustic signals. In some embodiments, the rain sensing apparatus comprises a microphone. The technology is not limited in the type of microphone that is used. For example, in some embodiments, the microphone is an electret microphone. In some embodiments, the microphone is a condenser microphone. In some embodiments, the technology comprises use of an electret microphone that does not require phantom power. Accordingly, in some embodiments, the technology does not comprise a condenser microphone (e.g., a microphone that requires phantom power) and is thus, in some embodiments, a "condenser microphone-free" rain sensing apparatus.

In some embodiments, the microphone is a piezoelectric microphone. In piezoelectric microphone embodiments, the piezoelectric element does not detect impacts of a surface directly (e.g., by attachment to the impacted surface), but instead detects acoustic signals propagated from the contacted surface (e.g., the sonde shell) through a non-solid phase (e.g., a gas (e.g., air)) to the microphone in the internal volume.

In some embodiments, the microphone is a ribbon microphone, a carbon microphone, fiber optic microphone (see, e.g., Paritsky and Kots (1997) "Fiber optic microphone as a realization of fiber optic positioning sensors" Proceedings of the International Society for Optical Engineering (SPIE). 10th Meeting on Optical Engineering in Israel. 3110: 408-09, incorporated herein by reference), a laser microphone, or a microelectrical-mechanical system (MEMS) microphone.

The microphone detects acoustic signals produced by impacts of hydrometeors on the external surface of the sonde (e.g., external surface of the sonde shell). Transformation, processing, and analysis of the acoustic signal provides information characterizing the rain drops impacting the sonde. In some embodiments, the microphone is not placed at the center of the sphere so that the distances from the microphone to different points on the sonde surface are different and thus the signal contains information about the location of drop impact on the sonde.

Accordingly, in some embodiments the microphone is placed at a position that is on the vertical axis of the sonde and approximately 20 to 80 mm above the sphere center. In some embodiments, the microphone is placed at a position that is on the vertical axis of the sonde and approximately 25 to 75 mm above the sphere center. In some embodiments, the microphone is placed at a position that is on the vertical axis of the sonde and approximately 30 to 70 mm above the sphere center.

In some embodiments, the microphone is placed at a position that is on the vertical axis of the sonde and approximately 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 70 mm above the sphere center.

In some embodiments, the microphone is not placed on the vertical axis of the sonde, e.g., in some embodiments the microphone is placed approximately 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 70 mm away from the sphere center in any direction. In some embodiments, the microphone is placed at the sphere center.

In some embodiments, the microphone is placed at a position within the sonde that is measured relative to the size (e.g., diameter (D) and/or the radius (R)) of the sonde. Accordingly, in some embodiments the microphone is placed at a position that is on the vertical axis of the sonde and is positioned at a distance that is approximately 0.05×D to 0.95×D above the sonde center (e.g., a distance that is approximately 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95×D above the sonde center). In some embodiments the microphone is placed at a position that is on the vertical axis of the sonde and is positioned at a distance that is approximately 0.2×D to 0.8×D above the sonde center (e.g., a distance that is approximately 0.2, 0.25, 0.3, 0.35, 0.4, 0.45, 0.5, 0.55, 0.6, 0.65, 0.7, 0.75, 0.8×D above the sonde center). In some embodiments the microphone is placed at a position that is on the vertical axis of the sonde and is positioned at a distance that is approximately 0.3×D to 0.7×D above the sonde center (e.g., a distance that is approximately 0.3, 0.35, 0.4, 0.45, 0.5, 0.55, 0.6, 0.65, 0.7×D above the sonde center). In some embodiments, the microphone is not placed on the vertical axis of the sonde, e.g., in some embodiments the microphone is placed approximately 0.05×D to 0.95×D away from the sonde center (e.g., a distance that is approximately 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, or 0.95×D away from the sonde center in any direction).

Weather Sensing Device Integrating Rain Sensing Technology

In some embodiments, the rain sensing technology (e.g., apparatus or components thereof) is integrated into a weather-sensing device as described in U.S. Pat. Nos. 9,846,092 and 9,958,346, each of which is incorporated herein by reference in its entirety. See Example 1. For example, in some embodiments, the rain sensing technology is integrated into a weather sensing device, e.g., a device to sense, measure, and/or collect weather data, atmospheric data, environmental data, etc., such as wind speed and/or direction; hydrometeor size, volume, mass, etc.; and/or hydrometeor impact speed, force, direction, rate, number, kinetic energy, etc. Exemplary embodiments of a weather sensing device according to the technology comprise a drag generating component (optionally comprising a shaft) attached to a grounded fixture by one or more stress or strain sensing devices and/or stress or strain components. The strain produced on the drag generating component (optionally comprising a shaft) is sensed by the two or more strain or stress sensing devices (e.g., a load cell and/or a component comprising a load cell) attached to the drag generating component (optionally comprising a shaft). The technology is not limited in the shape of the drag generating component. In some embodiments, the drag generating component is a sphere. In some embodiments, the drag generating component is spheroid, ellipsoid, cylindrical, or polyhedral. In some embodiments, the drag generating component of the weather sensing device (e.g., for detecting wind speed and/or direction and/or for detecting hydrometeor speed and/or direction) is also the sonde of the rain detection technology, e.g., one component of the weather sensing device is both the sonde and the drag generating component (e.g., a sonde/drag generating component).

In some embodiments, the drag generating component (optionally comprising a shaft) is attached by one or more stress sensing devices to a rigid grounded fixture. That is, in some embodiments, one or more stress sensing devices is directly attached to the drag generating component (optionally comprising a shaft) and the one or more stress sensing devices is directly attached to the rigid grounded fixture. In some embodiments, one or more stress sensing devices is directly attached to a shaft (connected to a drag generating component) and the one or more stress sensing devices is directly attached to the rigid grounded fixture. In some embodiments, the strain or stress sensing devices are, e.g., strain gages, semiconductor strain gages, piezo crystals, resistive elements, capacitive elements, inductive elements, acoustic sensors, optical sensors, load cells, or the like. The stress or strain detected by each strain or stress sensing device is converted to an electrical signal, e.g., a voltage, a current, a resistance, etc., by the electronic components of the device. In some embodiments, the analog signal is further converted into a digital signal, e.g., by an analog/digital (A/D) converter. In some embodiments, a microprocessor is configured to receive and process a digital signal. In some embodiments, the weather sensing device comprises a sound sensor (e.g., microphone) that finds use in correcting data describing hydrometeor impacts.

The strain sensing devices produce data that are input into an algorithm or model for determining the magnitude and/or direction vector of the weather related phenomena (e.g., hail, wind) detected by the device. In particular, the relative strains on each strain or stress sensing device are used to calculate the magnitude and/or direction vector of the weather related phenomena detected by the device. In some embodiments, sound data are used to correct the magnitude and/or direction vector of the weather related phenomena (e.g., hydrometeor impact and/or wind). In some embodiments, the vector is determined in a two-dimensional coordinate system; in some embodiments, the vector is determined in a three-dimensional coordinate system. In some embodiments, the sensors reside within the coordinate system in which the vector is determined. In some embodiments, the sensors are used to establish the coordinate system used to determine the vector in two-dimensions or three-dimensions.

In some embodiments, one or more of the strain or stress sensing devices is a load cell or a component comprising a load cell (e.g., a component connecting the drag generating component to the grounded fixture). In some embodiments, a load cell comprises strain or stress sensing devices. Load cells are widely used off-the-shelf components and are available commercially (e.g., from HBM, Inc., Marlborough, MA). In some embodiments, load cells comprise one or more strain gages and, in some embodiments, comprise a hole or a cutout. In some embodiments the drag generating component (optionally comprising a shaft) is attached by one or more load cells to a rigid grounded fixture, e.g., in some embodiments, one or more stress sensing devices is directly attached to the drag generating component and/or shaft and the one or more stress sensing devices is directly attached to the rigid grounded fixture. In some embodiments, the load cells comprise a design and/or construction that impart in the load cells the ability to sense stress and/or strain.

In some embodiments, the load cells are designed to be sensitive only to bending moments along their longitudinal axis. In some embodiments, a load cell comprises one or more holes or cutouts, e.g., perpendicular to the longitudinal axis of the load cell. However, it is to be understood that the technology is not limited to the exact configuration of the load cell. There are numerous different ways to position the load cells and provide a hole in the beam to obtain the desired strain characteristics. In some embodiments, a load cell is used to measure torsion around the longitudinal axis and/or a force applied along the longitudinal axis. In some embodiments, load cells are sensitive to longitudinal loading and are mounted vertically. In some embodiments, load cells are sensitive to torsional loading and are mounted underneath the shaft or on the periphery of the shaft, e.g., to measure forces inducing a twist in the shaft. In some embodiments, a load cell is mounted on the middle of the shaft. In some embodiments, a load cell is mounted directly to the drag generating component, e.g., to provide embodiments of the device that do not comprise a shaft. The technology is applicable to devices comprising any number of strain sensing devices (e.g., load cells). In some embodiments, the analysis comprises calculating the force on the drag generating component, e.g., by adding the forces (e.g., as represented by force vectors) experienced by the strain sensing devices. In an exemplary embodiment, three force vectors are added to determine the force (e.g., magnitude and angle) imparted on the drag generating component.

In some embodiments, the weather-sensing apparatus measures wind velocity (e.g., speed and direction) and detects individual hydrometeors (e.g., hail). While, in some embodiments, the rain sensing apparatus described herein is integrated into a weather-sensing apparatus (e.g., as described in U.S. Pat. Nos. 9,846,092 and 9,958,346), the technology is not limited to such embodiments. Thus, in some embodiments, the rain sensing apparatus comprises a sonde, stalk, and a microphone as described herein and does not necessarily comprise a drag-generating component, stalk or tube, strain sensors (e.g., load cells), and/or other components of the weather-sensing apparatus as described in U.S. Pat. Nos. 9,846,092 and 9,958,346.

Furthermore, in some embodiments, the technology described herein comprises using the microphone as described herein to accept or reject candidate hydrometeor (e.g., hail) impacts. For example, in some embodiments, after a hydrometeor impact is detected (e.g., in one or more load cells attaching a drag generating component to a rigid base), the previous approximately 2 ms (1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 ms) of microphone data are saved along with the following 10 ms (e.g., 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or 15.0 ms) of microphone data. Next, in some embodiments, the spike of the microphone signal is aligned with the peak of the hydrometeor impact, according to the speed of sound. In some embodiments, the microphone signal peak is measured and characterized to provide a power of the hydrometeor (e.g., hail) impact. If the power of the hydrometeor (e.g., hail) impact represented by the signal peak is sharp and sufficiently high, the candidate hydrometeor (e.g., hail) impact is identified as a verified hydrometeor (e.g., hail) impact. For example, in some embodiments, a sample that changes at least 10,000 bits (e.g., in a 16-bit converter) within a 1 ms time is considered to be sharp and sufficiently high to be a verified hydrometeor. In some embodiments, a sample that changes at least 1,000 to 100,000 bits (e.g., approximately 1000, 2000, 3000, 4000, 5000, 6000, 7000, 8000, 9000, 10000, 20000, 30000, 40000, 50000, 60000, 70000, 80000, 90000, or 100000 bits) (e.g., in a 16-bit converter) within a 0.1 to 10 ms time (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 ms) is considered to be sharp and sufficiently high to be a verified hydrometeor. In some embodiments, the microphone and/or hydrometeor impact data are passed on for additional processing as described herein.

Limited Rain Sampling Area

Figure 14:
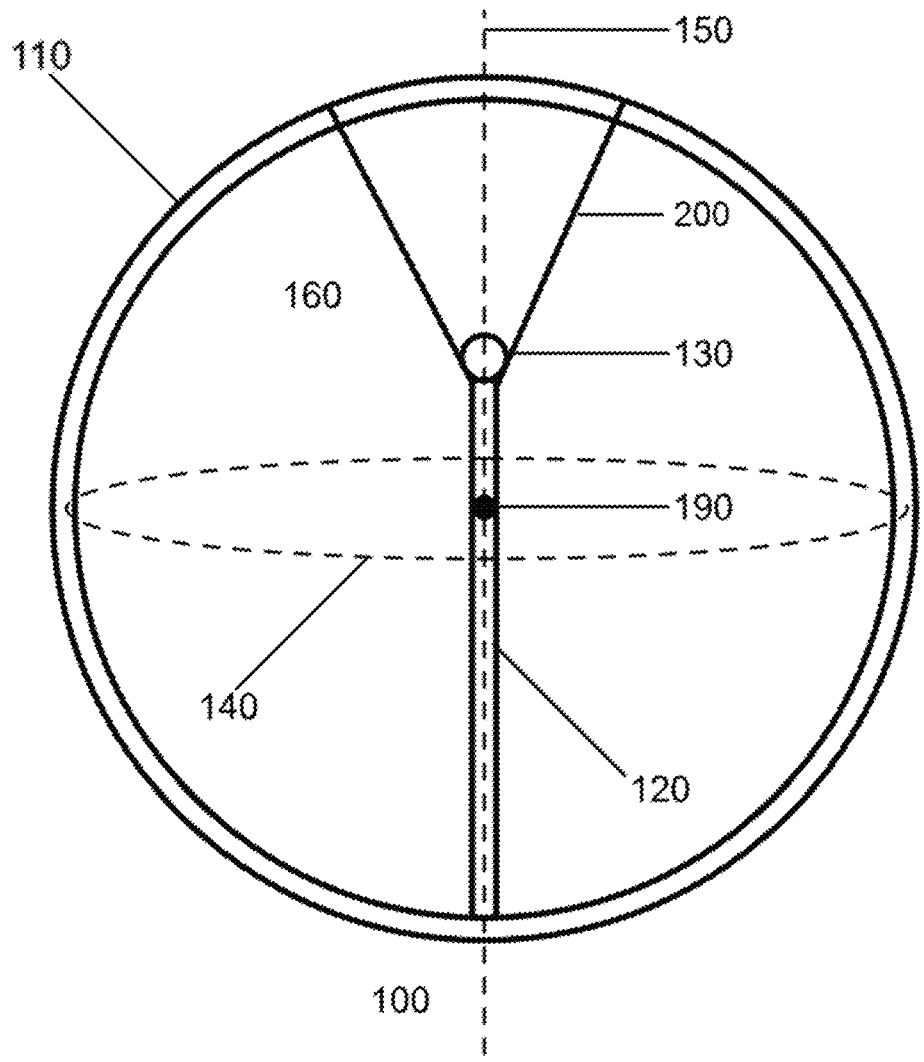
FIG. 14 is a schematic drawing of an embodiment of a rain-sensing apparatus comprising a cone piece 200 to provide an apparatus with a limited rain-sensing area. Other numbered components are as described herein for FIG. 1.
Figure 15:
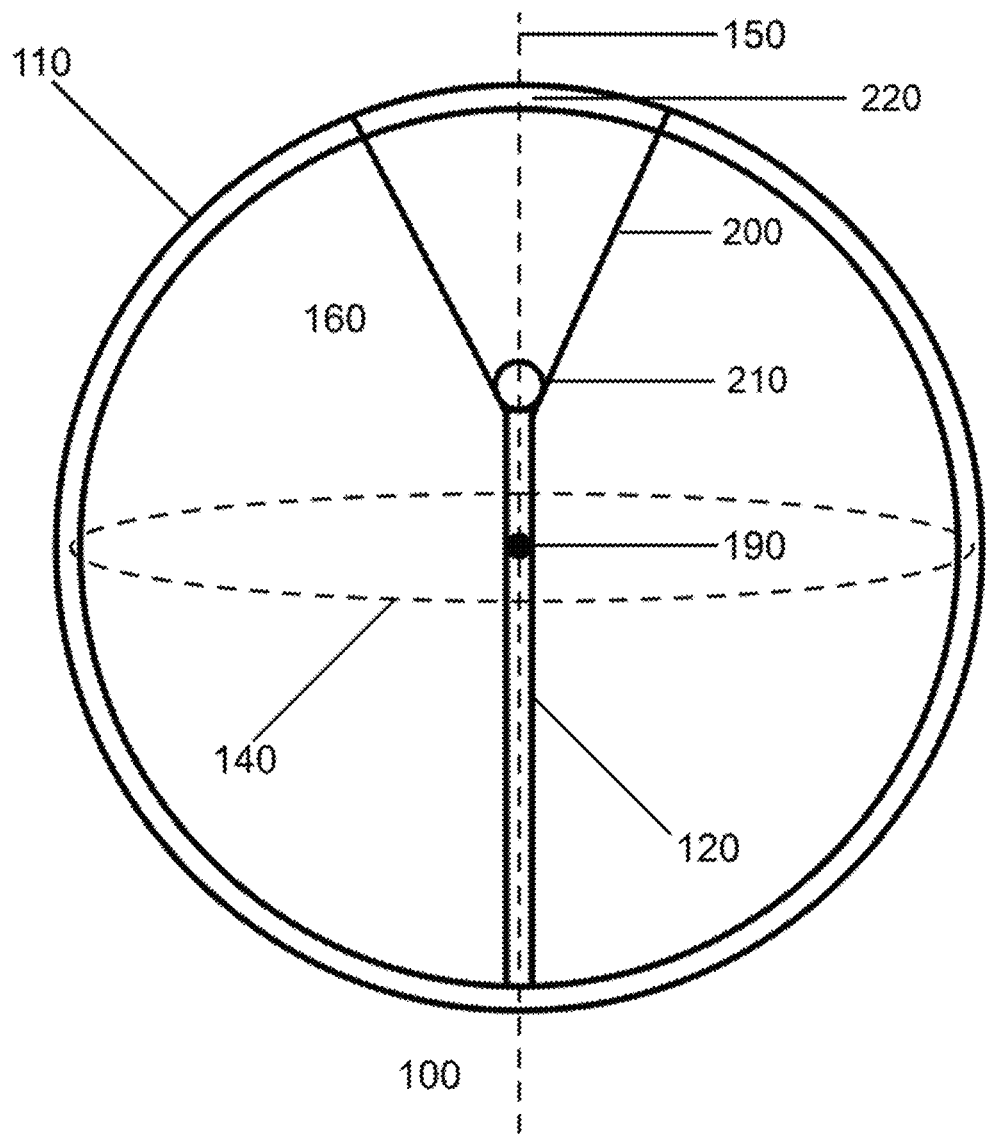
FIG. 15 is a schematic drawing of an embodiment of a rain-sensing apparatus comprising a pyranometer or other solar radiance sensor near the microphone area (210). In some embodiments, the apparatus further comprises a portion (a "drum head" section) 220 that is optically clear, translucent, or otherwise allows transmission of solar radiation to the pyranometer or other solar radiance sensor. Other numbered components are as described herein for FIG. 1.

In some embodiments, the technology provides a rain-sensing apparatus comprising a limited rain-sampling area (FIG. 14). In some embodiments, limiting the rain-sampling area results in fewer observed drops, effectively filtering out droplet signatures that fall outside of the sampling area. In some embodiments, limiting the area of rain detection provides a technology for quantifying individual raindrops on the sonde and thus producing more disdrometric information, e.g., in some embodiments mimicking and/or providing some functions of a conventional disdrometer.

In some embodiments, a rain-sensing apparatus comprising a limited rain-sampling area comprises a sonde (e.g., a hollow sonde) comprising a hole and a cone piece installed in the hole. In some embodiments, the cone piece comprises a "drum head" (200) that is at the sonde surface and a cone body that is installed around the top of the microphone, tunneling sound waves to the microphone. In some embodiments, installing the cone piece comprises screwing in the cone piece (e.g., comprising a cone body and drum head). In some embodiments, the cone piece comprises the microphone for ease of replacement. In some embodiments, the drum head is made from a material different than the sonde; in some embodiments, the drum head is made from the same material as the sonde. In some embodiments, the drum head provides different acoustic properties than the sonde. The seal between the cone/drum head and metal shell would be important for weatherization and acoustic dampening properties.

In some embodiments, an apparatus provided herein comprises a pyranometer or other solar radiance sensor. In some embodiments, the pyranometer or other solar radiance sensor is placed near the microphone area (210) and the drum head is an optically clear plastic or other diffuse material (220) that allows the cone piece assembly to be a dual rain/solar radiation sensor. In some embodiments, rain and solar radiance measurements are combined for cost savings and to provide a dual predictor of storm advancement. In some embodiments, the microphone area (210) includes solar photovoltaic cells to provide power to the unit.

Rain Detection Methods

The technology further provides methods of detecting rain (e.g., individual drops, rain accumulation, rain rate, etc.). In some embodiments, methods comprise providing an apparatus as described herein. In some embodiments, the technology provides methods of detecting rain, e.g., individual rain drops, accumulated rainfall, and/or rain rate using an apparatus as described herein. In some embodiments, methods comprise obtaining, making, using, and/or providing a rain detection apparatus as described herein (e.g., a rain-sensing apparatus comprising a sonde and a transducer and, in some embodiments, a stalk). In some embodiments, methods comprise obtaining, making, using, and/or providing one or more components of a rain detection apparatus as described herein (e.g., one or more first components comprising a sonde or a transducer or, in some embodiments, a stalk) for combination with additional components of a rain detection apparatus as described herein (e.g., one or more second components comprising a sonde or a stalk or, in some embodiments, a transducer) to provide a complete rain sensing apparatus.

In some embodiments, methods comprise detecting the impact of one or more rain drops on the surface of a sonde of an embodiment of an apparatus as described herein. In some embodiments, methods comprise determining the angle of impact of a rain drop on the surface of the sonde. In some embodiments, methods comprise determining the position of impact of a rain drop on the surface of the sonde. In some embodiments, a vector is determined describing the motion of a rain drop at the moment of impact with the sonde.

In some embodiments, methods comprise determining the impact energy transferred to the sonde by a rain drop impact. In some embodiments, methods comprise recording and/or acquiring an acoustic signal produced by the impact of a rain drop with the sonde. In some embodiments, methods comprise recording and/or acquiring an acoustic signal having an oscillation in the range of from approximately 6 to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz). In some embodiments, methods comprise recording and/or acquiring an acoustic signal in a frequency range that encompasses the natural, primary frequency of the sonde (e.g., approximately 6 to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz)).

In some embodiments, methods comprise calculating, producing, and/or recording a time-varying signal (e.g., a digital time-varying signal produced by sampling an analog output of the apparatus (e.g., apparatus transducer) at a frequency of approximately 25 to 100 kHz (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 kHz).

In some embodiments, methods comprise recording and/or acquiring an analog voltage (e.g., from the transducer). In some embodiments, methods comprise sampling the analog voltage at 25 to 50 kHz (e.g., at 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, 40.0, 40.1, 40.2, 40.3, 40.4, 40.5, 40.6, 40.7, 40.8, 40.9, 41.0, 41.1, 41.2, 41.3, 41.4, 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, 45.0, 45.1, 45.2, 45.3, 45.4, 45.5, 45.6, 45.7, 45.8, 45.9, 46.0, 46.1, 46.2, 46.3, 46.4, 46.5, 46.6, 46.7, 46.8, 46.9, 47.0, 47.1, 47.2, 47.3, 47.4, 47.5, 47.6, 47.7, 47.8, 47.9, 48.0, 48.1, 48.2, 48.3, 48.4, 48.5, 48.6, 48.7, 48.8, 48.9, 49.0, 49.1, 49.2, 49.3, 49.4, 49.5, 49.6, 49.7, 49.8, 49.9, or 50.0 kHz) to produce a digital time varying signal. In some embodiments, the analog voltage is sampled at 32 or 44.1 kHz to produce a digital time varying signal. In some embodiments, the analog voltage is sampled at 8, 12, 16, 24, 32, 64, 128, or 256 bits of resolution.

In some embodiments, methods comprise recording and/or acquiring an analog voltage (e.g., from the transducer). In some embodiments, methods comprise sampling the analog voltage at 25 to 100 kHz (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 kHz) to produce a digital time varying signal. In some embodiments, the analog voltage is sampled at 32, 44.1, or 96 kHz to produce a digital time varying signal. In some embodiments, the analog voltage is sampled at 8, 12, 16, 24, 32, 64, 128, or 256 bits of resolution.

In some embodiments, methods comprise detecting the location of impact of a rain drop on the sonde surface ($\theta$) using the analog and/or digital signal. In some embodiments, methods comprise detecting the impact angle of a raindrop on the sonde surface ($\Psi^2$) using the analog and/or digital signal. In some embodiments, methods comprise detecting a time of impact of a raindrop on the sonde surface using the analog and/or digital signal.

In some embodiments, methods comprise detecting and/or measuring the velocity, speed, direction, acceleration, momentum, size, volume, mass, composition, or shape of a raindrop impacting the sonde surface. In some embodiments, methods comprise determining a vector describing the velocity, momentum, direction, and/or acceleration of a raindrop impacting the sonde surface. In some embodiments, methods comprise calculating the velocity, speed, direction, acceleration, momentum, size, volume, mass, composition, or shape of a raindrop impacting the sonde surface. In some embodiments, methods comprise calculating a vector describing the velocity, momentum, direction, and/or acceleration of a raindrop impacting the sonde surface. In some embodiments, methods comprise detecting, determining, and/or calculating an amount of impact (e.g., kinetic) energy transferred from a raindrop to the sonde.

In some embodiments, the methods comprise providing the digital time varying signal as a datastream in real time. In some embodiments, methods comprise analyzing the digital time varying signal (datastream) in real time. In some embodiments, the datastream is analyzed by a component of the apparatus configured to compute statistical parameters that correspond to rain and characterize rain. In some embodiments, the datastream is sent to a remote component and said remote component is configured to compute statistical parameters that correspond to rain and characterize rain. Accordingly, methods comprise computing statistical parameters describing rain (e.g., rain rate, rain accumulation, etc.) from the datastream.

In some embodiments, methods comprise analyzing (e.g., in real time) a datastream, e.g., provided by the time-varying digital signal. In some embodiments, methods comprise calculating a statistical parameter from the datastream, e.g., provided by the time-varying digital signal, that correspond and/or correlate to rainfall, raindrops, and/or characteristics of rainfall and/or raindrops (e.g., location of impact of a rain drop on the sonde surface ($\theta$), impact angle of a raindrop on the sonde surface ($\Psi^2$), rain rate, raindrop velocity, raindrop speed, raindrop direction, raindrop acceleration, raindrop momentum, raindrop size, raindrop volume, raindrop mass, raindrop composition, raindrop shape, raindrop velocity vector, raindrop momentum vector, raindrop direction vector, raindrop acceleration vector, and/or amount of impact (e.g., kinetic) energy transferred from a raindrop to the sonde). In some embodiments, methods comprise calculating a mean, median, range, maximum, minimum, mode, distribution, standard deviation or other statistical treatment of rainfall and/or raindrop characteristics (e.g., location of impact of a rain drop on the sonde surface ($\theta$), impact angle of a raindrop on the sonde surface ($\Psi^2$), rain rate, raindrop velocity, raindrop speed, raindrop direction, raindrop acceleration, raindrop momentum, raindrop size, raindrop volume, raindrop mass, raindrop composition, raindrop shape, raindrop velocity vector, raindrop momentum vector, raindrop direction vector, raindrop acceleration vector, and/or amount of impact (e.g., kinetic) energy transferred from a raindrop to the sonde).

In some embodiments, methods comprise detecting, measuring, and/or calculating an acoustic signature of rain, e.g., a characteristic signature of a rain drop impact or a plurality of rain drop impacts on the sonde. In some embodiments, methods comprise recording a pulse train produced by the impacts of rain drops on the sonde. In some embodiments, methods comprise detecting, measuring, and/or calculating an oscillation produced by a rain drop or a plurality of rain drops, e.g., corresponding to a natural frequency of the sonde (e.g., at a frequency of approximately 6-10 kHz (e.g., 6, 6.5, 7, 7.5, 8, 8.5, 9, 9.5, or 10 kHz)). In some embodiments, methods comprise analyzing an oscillation produced by a rain drop or a plurality of rain drops to detect an amplitude modulation (AM) of the primary ring frequency. In some embodiments, methods comprise analyzing an oscillation produced by a rain drop or a plurality of rain drops to identify a characteristic AM signature of the rain drop or a plurality of rain drops. In some embodiments, the characteristic AM signature of the rain drop or a plurality of rain drops comprises components that correlate with a parameter of an individual impacting drop, e.g., location of impact of a rain drop on the sonde surface (θ), impact angle of a raindrop on the sonde surface (Ψ2), raindrop velocity, raindrop speed, raindrop direction, raindrop acceleration, raindrop momentum, raindrop size, raindrop volume, raindrop mass, raindrop composition, raindrop shape, raindrop velocity vector, raindrop momentum vector, raindrop direction vector, raindrop acceleration vector, and/or amount of impact (e.g., kinetic) energy transferred from a raindrop to the sonde.

In some embodiments, the methods comprise demodulating an amplitude modulated signal, e.g., to provide signals or data describing droplet size and/or position of droplet impact on the sonde surface. In some embodiments, the methods comprise demodulating an amplitude modulated signal, e.g., to provide signals or data describing mean droplet size and/or mean position of droplet impact on the sonde surface. In some embodiments, methods comprise transforming an acoustic signal (e.g., an amplitude modulated acoustic signal) to provide a demodulated signal. In some embodiments, transforming the acoustic signal comprises continuously applying demodulation to discrete points (e.g., using a running method), identifying peaks in the absolute value of signal intensity, and/or interpolating intermediate points between known peaks (e.g., according to Equation 1).

In some embodiments, methods comprise calculating peak acoustic power (P-value) and/or acoustic energy ($E_a$). In some embodiments, the demodulated signal comprises positive values corresponding to the instantaneous amplitude of the primary ring oscillation. In some embodiments, methods comprise identifying the peak of the demodulated signal. In some embodiments, methods comprise assigning the peak acoustic power (P-value) to be the peak value of the demodulated signal. In some embodiments, methods comprise numerically summing the acoustic power signature of a single drop impact. In some embodiments, numerically summing the acoustic power signature of a single drop impact produces a curve that approaches an asymptotic value. In some embodiments, methods comprise identifying the asymptotic value of the numerically summed acoustic power signature of a single drop impact. In some embodiments, methods comprise assigning the total acoustic energy ($E_a$) associated with the drop impact to be the asymptotic value of the numerically summed acoustic power signature of a single drop impact.

In some embodiments, methods comprise calculating location of impact of a rain drop on the sonde surface (θ), impact angle of a raindrop on the sonde surface (Ψ2), raindrop velocity, raindrop speed, raindrop direction, raindrop acceleration, raindrop momentum, raindrop size, raindrop volume, raindrop mass, raindrop composition, raindrop shape, raindrop velocity vector, raindrop momentum vector, raindrop direction vector, raindrop acceleration vector, and/or amount of impact (e.g., kinetic) energy transferred from a raindrop to the sonde using the total acoustic energy ($E_a$) associated with a raindrop impact.

In some embodiments, methods comprise numerical summing the acoustic power of a single drop to provide a value for acoustic energy ($E_a$). In some embodiments, methods comprise detecting, measuring, and/or calculating peak acoustic power (P-value) of a single rain drop impact. In some embodiments, methods comprise detecting, measuring, and/or calculating acoustic energy (Ea) of a single rain drop impact.

In some embodiments, methods comprise analyzing the acoustic signal from raindrop impacts on a sonde of an apparatus provided herein. In some embodiments, methods comprise obtaining an acoustic signal from raindrop impacts on the sonde (e.g., obtained by a microphone), digitizing the acoustic signal, and processing the digitized acoustic signal. In some embodiments, processing the digitized acoustic signal comprises demodulating an amplitude modulated signal. In some embodiments, demodulating an amplitude modulated signal comprises demodulating a real-time digital signal, e.g., by applying demodulation continuously (e.g., to discrete points using a running method). In some embodiments, demodulating the amplitude modulated signal comprises identifying peaks in the absolute value of signal intensity. In some embodiments, demodulating the amplitude modulated signal comprises interpolating between known peaks. In some embodiments, processing the digitized acoustic signal comprises applying an envelope (e.g., an "airplane" filter) to the digital acoustic signal. In some embodiments, applying an envelope or filter to the digital acoustic signal comprises preserving the P-value and acoustic energy ($E_a$) of individual raindrop impacts.

In some embodiments, methods comprise applying an airplane filter using Equation 2, wherein $f_c$ is adjusted to allow a sharp climb to preserve the initial peak (P-value) and the glide function $f_g$ is an exponential form with a time constant on the order of approximately 1 to approximately 10 milliseconds (e.g., approximately 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 milliseconds).

In some embodiments, applying an envelope or filter (e.g., an airplane filter with a short glide provided by the glide function $f_g$) to the digital acoustic signal preserves the fine (e.g., approximately 1-3 Hz) structure in the oscillation. Thus, in some embodiments, methods comprise preserving the fine (e.g., approximately 1-3 Hz) structure in the oscillation.

In some embodiments, applying an envelope or filter (e.g., an airplane filter with a long glide provided by the glide function $f_g$) to the digital acoustic signal comprises removing the fine (e.g., approximately 1-3 Hz) structure in the oscillation. Accordingly, in some embodiments, methods comprise using a long glide function to downsample the acoustic digital signal to approximately 3.2 Hz (e.g., approximately 2.5 to 4.0 Hz (e.g., approximately 2.5, 2.6, 2.7, 2.8, 2.9, 3.0, 3.1, 3.2, 3.3, 3.4, 3.5, 3.6, 3.7, 3.8, 3.9, or 4.0 Hz)), while still preserving the P-value and $E_a$ parameters. Thus, in some embodiments, methods comprise downsampling the digital acoustic signal to approximately 3.2 Hz (e.g., approximately 2.5 to 4.0 Hz (e.g., approximately 2.5, 2.6, 2.7, 2.8, 2.9, 3.0, 3.1, 3.2, 3.3, 3.4, 3.5, 3.6, 3.7, 3.8, 3.9, or 4.0 Hz)) and preserving the P-value and $E_a$ parameters.

In some embodiments, methods comprise filtering the real-time digital signal. In some embodiments, methods comprise filtering the demodulated real-time digital signal. In some embodiments, filtering the real-time digital signal (e.g., the demodulated real-time digital signal) comprises applying a running calculation on the real-time digital signal to generate a new series from the demodulated real-time digital signal. In some embodiments, filtering the real-time digital signal (e.g., the demodulated real-time digital signal) comprises preserving the P-value of individual raindrop impacts. In some embodiments, filtering the real-time digital signal (e.g., the demodulated real-time digital signal) comprises preserving the acoustic energy (Ea) of individual raindrop impacts. In some embodiments, filtering the real-time digital signal (e.g., the demodulated real-time digital signal) comprises preserving the fine (e.g., approximately 1-3 Hz (e.g., approximately 1, 1.2, 1.4, 1.6, 1.8, 2.0, 2.2, 2.4, 2.6, 2.8, or 3.0 Hz)) structure in the oscillation. In some embodiments, methods comprise calculating information about impact positions and/or water puddling from the fine (e.g., approximately 1-3 Hz (e.g., approximately 1, 1.2, 1.4, 1.6, 1.8, 2.0, 2.2, 2.4, 2.6, 2.8, or 3.0 Hz)) structure. In some embodiments, filtering the real-time digital signal (e.g., the demodulated real-time digital signal) comprises removing the fine (e.g., approximately 1-3 Hz (e.g., approximately 1, 1.2, 1.4, 1.6, 1.8, 2.0, 2.2, 2.4, 2.6, 2.8, or 3.0 Hz)) structure in the oscillation.

In some embodiments, filtering the real-time digital signal (e.g., the demodulated real-time digital signal) comprises downsampling the real-time digital signal (e.g., the demodulated real-time digital signal) to produce a downsampled real-time digital signal. In some embodiments, filtering the real-time digital signal (e.g., the demodulated real-time digital signal) comprises downsampling the real-time digital signal (e.g., the demodulated real-time digital signal) to produce a downsampled real-time digital signal a frequency of approximately 2.5 to 4.0 Hz (e.g., approximately 2.5, 2.6, 2.7, 2.8, 2.9, 3.0, 3.1, 3.2, 3.3, 3.4, 3.5, 3.6, 3.7, 3.8, 3.9, or 4.0 Hz)). In some embodiments, downsampling the real-time digital signal (e.g., the demodulated real-time digital signal) comprises preserving the P-value and/or the Ea value. Accordingly, in some embodiments, the downsampled real-time digital signal has a frequency of approximately 2.5 to 4.0 Hz (e.g., approximately 2.5, 2.6, 2.7, 2.8, 2.9, 3.0, 3.1, 3.2, 3.3, 3.4, 3.5, 3.6, 3.7, 3.8, 3.9, or 4.0 Hz)). In some embodiments, the downsampled real-time digital signal preserves the P-value. In some embodiments, the downsampled real-time digital signal preserves the $E_a$.

In some embodiments, methods comprise determining droplet size from P-value. In some embodiments, methods comprise determining droplet size from $E_a$. In some embodiments, methods comprise determining droplet impact position on the sonde from P-value. In some embodiments, methods comprise determining droplet impact position on the sonde from Ea.

In some embodiments, methods comprise determining rain rate. In some embodiments, methods comprise detecting, measuring, and/or calculating a rain rate. In some embodiments, methods comprise using signal processing and/or statistical analysis to determine rain rate from an acoustic signal. In some embodiments, methods comprise using signal processing and/or statistical analysis to determine rain rate from a time-varying signal, a digital time-varying signal, a transformed acoustic signal, a demodulated acoustic signal, a filtered real-time digital signal, and/or a downsampled real-time digital signal. In some embodiments, methods comprise using statistical treatment of an acoustic signal, a time-varying signal, a digital time-varying signal, a transformed acoustic signal, a demodulated acoustic signal, a filtered real-time digital signal, a downsampled real-time digital signal to determine rain rate. In some embodiments, methods comprise identifying signal features (e.g., of the acoustic signal) that relate to the disdrometric characteristics of rainfall. In some embodiments, methods comprise identifying signal features (e.g., of the acoustic signal) that correlate to a rain rate. In some embodiments, methods comprise estimating rain rate over time. In some embodiments, methods comprise calculating a rain accumulation using an estimated rainfall rate.

In some embodiments, methods comprise measuring, determining, and/or calculating dependence of the acoustic signal on droplet size and/or impact location on the sonde (θ). In some embodiments, measuring, determining, and/or calculating rain rate comprises measuring, determining, and/or calculating the dependence of the acoustic signal on droplet size and/or impact location on the sonde (θ). In some embodiments, measuring, determining, and/or calculating rain rate comprises measuring, determining, and/or calculating a P-value. In some embodiments, measuring, determining, and/or calculating rain rate comprises measuring, determining, and/or calculating an Ea value.

In some embodiments, determining rain rate comprises providing an apparatus as described herein (e.g., comprising a sonde and a microphone). In some embodiments, methods of determining rain rate further comprise recording and/or acquiring the audio signal of raindrops striking the exterior of the sonde. In some embodiments, methods comprise recording and/or acquiring characteristic pulses in the acoustic signal, each pulse corresponding to a single droplet. In some embodiments, methods of determining rain rate comprise downsampling the real-time audio signal, e.g., to extract the envelope of each pulse. In some embodiments, methods comprise determining droplet size and/or droplet position using a relationship between pulse parameters and droplet size and/or a relationship between pulse parameters and droplet position.

In some embodiments, methods comprise determining rain rate using a statistical correlation between the aggregate signal of multiple droplet strikes (and/or parameters of the aggregate signal) and rain rate. In some embodiments, methods comprise determining rain rate without counting individual droplets. In some embodiments, methods comprise determining rain rate using a correlation that statistically averages droplet signatures.

In some embodiments, methods of determining a rain rate comprise determining statistically averaged quantities associated with the real-time acoustic signal or filtered acoustic power signal. In some embodiments, methods comprise applying statistical treatments to the time-varying acoustic power signal to obtain a measure of rain rate. In some embodiments, methods comprise determining statistical parameters from a distribution of the time-varying acoustic power signal (e.g., peak height, frequency in various frequency bands, mean amplitude, shape and length of the tail of the distribution, shape of the distribution, etc.)

For example, in some embodiments, methods comprise filtering an audio signal (e.g., an analog signal, a digital (e.g., discretized) acoustic signal, and/or a real-time digital (e.g., discretized) signal as described herein) to remove and/or minimize information outside the frequency range of interest (e.g., approximately 6 kHz to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz) and/or approximately 25 to 100 kHz (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 kHz)). In some embodiments, the filter is a digital filter. In some embodiments, filtering the audio signal comprises applying a digital filter (e.g., a finite impulse response notch filter) to frequency data (e.g., provided by an audio signal (e.g., an analog signal, a digital (e.g., discretized) acoustic signal, and/or a real-time digital (e.g., discretized) signal as described herein (e.g., the digital signal from an analog-to-digital converter sampling analog microphone data as described herein))) to remove and/or minimize information outside the frequency range of interest (e.g., approximately 6 kHz to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz) and/or approximately 25 to 100 kHz (e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 kHz)). See, e.g., Oppenheim et al (1983) Signals and Systems (Englewood Cliffs, New Jersey; Prentice-Hall, Inc.), incorporated herein by reference.

Then, in some embodiments, the acoustic power of the filtered signal described above (e.g., filtered digital signal) is summed in the time domain over a defined window (e.g., from approximately 1 to 60 seconds (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 seconds)). In some embodiments, the acoustic power of the filtered signal (e.g., filtered digital signal) is summed in the time domain over a defined window of approximately 10 seconds (e.g., 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or 15.0 seconds). In some embodiments, the acoustic power of the filtered signal (e.g., filtered digital signal) is summed in the time domain over a defined window (e.g., approximately 10 seconds) and wind velocity over a second defined window (e.g., 20 to 300 seconds (e.g., 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300 seconds)) is used to normalize the response. In some embodiments, the acoustic power of the filtered signal (e.g., filtered digital signal) is summed in the time domain over a defined window (e.g., approximately 10 seconds) and wind velocity over a second defined window (e.g., approximately 60 seconds) is used to normalize the response. Accordingly, in some embodiments, the rain rate is defined for the defined window over which the acoustic power of the filtered signal (e.g., filtered digital signal) is summed. The wind normalization factor (e.g., determined over the second defined window) is calculated and applied to the rain rate in the cloud (e.g., on a server, computer, virtual machine, etc. remote from the rain detection apparatus). In some embodiments, a device-specific factory-defined calibration factor is applied in the cloud (e.g., on a server, computer, virtual machine, etc. remote from the rain detection apparatus) to the defined window over which the acoustic power is summed, which is then aggregated to a minute granularity. For example, for a defined window of 10 seconds for summing the acoustic power of the filtered signal (e.g., filtered digital signal) and a wind normalization factor calculated over a second defined window (e.g., approximately 60 seconds) of the wind readings, the normalization factor is calculated and the same normalization factor is applied to 6 separate 10-second rain rate readings. However, the technology is not limited to these particular time windows and includes longer or shorter defined windows for summing the acoustic power of the filtered signal (e.g., filtered digital signal) and second defined windows for calculating wind normalization factors.

In some embodiments, methods comprise applying peak-fitting to the filtered acoustic power signal ("P-Acoustic"). In some embodiments, methods comprise determining a rain rate by analyzing a distribution of P-Acoustic values. In some embodiments, methods comprise identifying individual peaks and their time of occurrence and amplitude (P-value), e.g., to provide a peak dataset. In some embodiments, methods comprise correcting peaks (e.g., for superposition). In some embodiments, methods comprise applying statistical treatments to a distribution of peak attributes (e.g., peak height, time of occurrence) of peaks in a peak dataset. In some embodiments, methods comprise determining an increase in rain rate by detecting an increase in P-values.

In some embodiments, methods comprise determining a parameter (e.g., peak height, characteristic width, and/or frequency of occurrence within various bands) from a distribution of raw acoustic power signal data or filtered acoustic power signal data. In some embodiments, methods comprise calculating a rain rate using a parameter from a distribution of raw acoustic power signal data or filtered acoustic power signal data. In some embodiments, methods comprise deriving a blended acoustic parameter incorporating multiple characteristics of the acoustic power distribution. In some embodiments, determining rain rate comprises use of a correlation function using a blended acoustic parameter or a P-value as input.

In some embodiments, methods comprise measuring instantaneous rain rate using a microphone acoustic signal and a power law function for calculating rain rate from the acoustic signal.

In some embodiments, methods comprise calibrating an apparatus as described herein, e.g., to improve accuracy of the apparatus for detecting rain drops, producing an acoustic signal, and/or for determining a rain rate. In some embodiments, methods comprise real-time and/or post-processing numerical (or analytical) transformation to convert a raw datastream to a datastream that measures the rain rate with improved accuracy than the raw datastream.

In some embodiments, methods comprise correcting a rain rate, acoustic power, acoustic energy, and/or other measurement for wind (e.g., for wind velocity). In some embodiments, the speed and/or direction of one or more rain drops is/are corrected for wind. In some embodiments, the raw acoustic signal detected by the transducer is corrected for wind and in some embodiments, the processed signal (e.g., demodulated signal, summed signal, etc.) is corrected for wind. In some embodiments, methods comprise calibrating a rain detection device. In some embodiments, calibrating a rain detection device comprises providing (e.g., calculating, producing, determining) a normalization constant (e.g., a device-specific normalization constant). In some embodiments, the normalization constant is based on the signal measured for a known rain rate. In some embodiments, the known rain rate is a normal rain. In some embodiments, a normal rain has a drop size distribution having a maximum drop size of approximately 4.0 mm in diameter. In some embodiments, a normal rain has a drop size distribution between 0.5 and 4.0 or 5.0 mm in diameter (e.g., a diameter of approximately 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mm). In some embodiments, calibrating a rain detection device comprises determining a calibration factor (e.g., normalization constant) for each individual device after manufacture of the device (e.g., prior to delivery of the device). In some embodiments, the device-specific calibration factor (e.g., normalization constant) is determined for a device and recorded for the specific device (e.g., using a unique identifier for the device that associates the normalization constant to the device and/or unique identifier). In some embodiments, the device-specific calibration factor (e.g., normalization constant) is applied in the cloud to data acquired by the device and sent to the cloud.

Rain Detection Systems

In some embodiments, the technology provides embodiments of systems comprising embodiments of the rain sensing apparatus described herein. Exemplary embodiments of a system comprise a rain sensing apparatus as described herein and a computer in communication with the apparatus. In some embodiments, the system comprises a second apparatus as described herein in communication with the first apparatus and/or in communication with the computer. The systems furthermore comprise in some embodiments a software component for implementing algorithms and models used to calculate a rain rate based on the acoustic signals recorded and processed by one or more apparatuses installed in a geographic region. In some embodiments, one or more of the apparatuses comprise a software component to calculate a rain rate. In some embodiments, acoustic signals (e.g., raw acoustic signal, filtered acoustic signal, and/or processed acoustic signal) are transmitted to a computer that comprises the software component to calculate a rain rate.

In some embodiments, a computer collects data from multiple apparatuses and comprises a software component to determine a rain rate based on the data collected from two or more apparatuses installed throughout a geographic region. In some embodiments, the software component predicts future weather events. In some embodiments, the systems further comprise an alerting component that issues an alert to a user or to another entity, e.g., for an action to be taken that is appropriate for the predicted weather events. System embodiments are implemented, for example, in a network of apparatuses and, in some embodiments, computers. A geographic area may be covered by a network or "micro-grid" of the apparatuses in communication with each other and, in some embodiments, a computer (e.g., a data server) to analyze the data from multiple apparatuses (e.g., apply a statistical analysis of the data). In some embodiments the systems provide a historical record, provide real-time monitoring, and/or provide predictions of weather events such as storms, temperature, front movements, rain, snow, pressure systems, wind speed, wind direction, ultraviolet radiation, heat index, air quality, dewpoint, ambient noise, etc.

In some embodiments, the apparatuses, methods, and systems described herein are associated with a programmable machine designed to perform a sequence of arithmetic or logical operations as provided by the methods described herein.

For example, some embodiments of the technology are associated with (e.g., implemented in) computer software and/or computer hardware. In one aspect, the technology relates to a computer comprising a form of memory, an element for performing arithmetic and logical operations, and a processing element (e.g., a microprocessor) for executing a series of instructions (e.g., a method as provided herein) to read, manipulate, and store data. In some embodiments, a microprocessor is part of a system for collecting acoustic signals, processing acoustic signals, determining a rain rate, and/or modeling weather data. Some embodiments comprise a storage medium and memory components. Memory components (e.g., volatile and/or nonvolatile memory) find use in storing instructions (e.g., an embodiment of a process as provided herein) and/or data (e.g., a work piece such as an acoustic signal, processed or filtered acoustic signal, P-value, P-Acoustic, $E_a$, etc.). Some embodiments relate to systems also comprising one or more of a CPU, a graphics card, and a user interface (e.g., comprising an output device such as display and an input device such as a keyboard).

Programmable machines associated with the technology comprise conventional extant technologies and technologies in development or yet to be developed (e.g., a quantum computer, a chemical computer, a DNA computer, an optical computer, a spintronics based computer, etc.).

In some embodiments, the technology comprises a wired (e.g., metallic cable, fiber optic) or wireless transmission medium for transmitting data. For example, some embodiments relate to data transmission over a network (e.g., a local area network (LAN), a wide area network (WAN), an ad-hoc network, the internet, etc.). In some embodiments, programmable machines are present on such a network as peers and in some embodiments the programmable machines have a client/server relationship.

In some embodiments, data are stored on a computer-readable storage medium such as a hard disk, flash memory, optical media, a floppy disk, etc.

In some embodiments, the technology provided herein is associated with a plurality of programmable devices that operate in concert to perform a method as described herein. For example, in some embodiments, a plurality of computers (e.g., connected by a network) may work in parallel to collect and process data, e.g., in an implementation of cluster computing or grid computing or some other distributed computer architecture that relies on complete computers (with onboard CPUs, storage, power supplies, network interfaces, etc.) connected to a network (private, public, or the internet) by a conventional network interface, such as Ethernet, fiber optic, or by a wireless network technology.

For example, some embodiments provide a computer that includes a computer-readable medium. The embodiment includes a random access memory (RAM) coupled to a processor. The processor executes computer-executable program instructions stored in memory. Such processors may include a microprocessor, an ASIC, a state machine, or other processor, and can be any of a number of computer processors, such as processors from Intel Corporation of Santa Clara, California and Motorola Corporation of Schaumburg, Illinois. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, Julia, and JavaScript.

Computers are connected in some embodiments to a network. Computers may also include a number of external or internal devices such as a mouse, a CD-ROM, DVD, a keyboard, a display, or other input or output devices. Examples of computers are personal computers, digital assistants, personal digital assistants, cellular phones, mobile phones, smart phones, pagers, digital tablets, laptop computers, internet appliances, and other processor-based devices. In general, the computers related to aspects of the technology provided herein may be any type of processor-based platform that operates on any operating system, such as Microsoft Windows, Linux, UNIX, Mac OS X, etc., capable of supporting one or more programs comprising the technology provided herein. Some embodiments comprise a personal computer executing other application programs (e.g., applications). The applications can be contained in memory and can include, for example, a word processing application, a spreadsheet application, an email application, an instant messenger application, a presentation application, an Internet browser application, a calendar/organizer application, and any other application capable of being executed by a client device.

All such components, computers, and systems described herein as associated with the technology may be logical or virtual.

In some embodiments, a computer or system provides diagnostic information about one or more weather sensing devices provided herein. For example, in some embodiments, a device, collection of devices, and/or system is able to self-check and/or report problems to a user. In some embodiments, a computer or system provides automatic calibration of a device, system, or collection of devices.

EXAMPLES

Example 1—Design of a Rain Sensing Apparatus

In some embodiments, the technology relates to a rain sensor apparatus and related rain sensing methods and systems. Accordingly, during the development of embodiments of the technology described herein, an exemplary embodiment of a rain sensing apparatus was designed, produced, and tested.

The exemplary rain sensor 100 comprised a sonde 110 (e.g., a hollow stainless steel sphere (e.g., approximately 200 mm in diameter and approximately 1.2 mm thick)), a stalk 120, and a microphone 130 (FIG. 1). The stalk extended into the volume 160 inside the sonde 110 and the microphone 130 was mounted at the top of the stalk 120. The stalk 120 was essentially and/or substantially aligned with the central vertical axis 150 of the sonde 110 and/or stalk 120. The microphone 130 was positioned above the equator 140 of the sonde 110, e.g., to maximize coupling of the rain sensor 100 to acoustic signals inside the volume 160 of the sonde 110. However, the technology is not limited to this placement of the microphone 130—in some embodiments, the microphone is positioned at the equator 140 of the sonde 110, below the equator 140 of the sonde 110, or displaced laterally from the vertical axis 150 of the sonde 110. In these various embodiments, the size, length, position, etc. of the stalk 120 is provided in the rain sensor 100 as appropriate to position the microphone 130 accordingly.

The microphone 130 comprises a circuit and has an electret design. The microphone is highly sensitive to acoustic signals in the range of from approximately 6 to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz). The microphone 130 produces an analog voltage proportional to the acoustic power. In some embodiments, the analog voltage is sampled at 32 kHz, 16-bits to produce a digital time varying signal. In some embodiments, the analog voltage is sample at 44.1 kHz. While the technology is described as comprising an electret microphone, the technology is not limited to an electret microphone. Accordingly, the technology comprises, in some embodiments, a condenser microphone or other electromechanical components that convert an acoustic signal to an electrical output.

In some embodiments, the rain sensor further comprises a tube (e.g., having an outer diameter of approximately 38.1 mm and a wall thickness of approximately 1.24 mm). In some embodiments, the tube extends downward (e.g., approximately 200 mm) from the sonde. In some embodiments, the tube terminates in a plug. In some embodiments, the stalk extends through the tube and into the sphere as described above. In some embodiments, the tube is made from stainless steel; in some embodiments, the plug is made from aluminum. In some embodiments, strain or force sensors (e.g., load cells) are attached to the plug and to the tube to provide mechanical support to the tube and to sense mechanical forces applied to the sonde. In some embodiments, exemplary forces sensed by the instrument include, for example, static loads (e.g., wind) or dynamic loads (e.g., wind gusts, shock from hydrometeor (e.g., hail) impacts, etc.) In some embodiments, the rain sensing apparatus is integrated into a weather-sensing device as described in U.S. Pat. Nos. 9,846,092 and 9,958,346, each of which is incorporated herein by reference in its entirety. While, in some embodiments, the rain sensing apparatus described herein is integrated into a weather-sensing apparatus (e.g., as described in U.S. Pat. Nos. 9,846,092 and 9,958,346), the technology is not limited to such embodiments. Thus, in some embodiments, the rain sensing apparatus comprises a sonde, stalk, and a microphone as described herein and does not necessarily comprise a drag-generating component, stalk or tube, strain sensors (e.g., load cells), and/or other components of the weather-sensing apparatus as described in U.S. Pat. Nos. 9,846,092 and 9,958,346.

Example 2—Detection of Rain Impacts

Falling rain impacts the sonde at various positions of the sonde surface, usually on the top hemisphere of the sonde in embodiments in which the sonde is spherical. Furthermore, rain can impact the sonde at various angles with respect to an axis of the sonde (e.g., an axis normal to the sonde surface (e.g., in embodiments in which the sonde is a sphere, the axis is normal to the sonde surface and extends through the sonde center). For example, rain can impact the sonde from the side (e.g., in the presence of wind). Thus, the location of rain impacts on the sonde surface and the impact angle of rain on the sonde surface at the impact location can both vary. In some analyses of rain impacts on the sonde, the limit on the angle of rain impact is horizontal (e.g., perpendicular to the vertical axis 150 of the sonde 100 as shown in FIG. 1).

Figure 2:
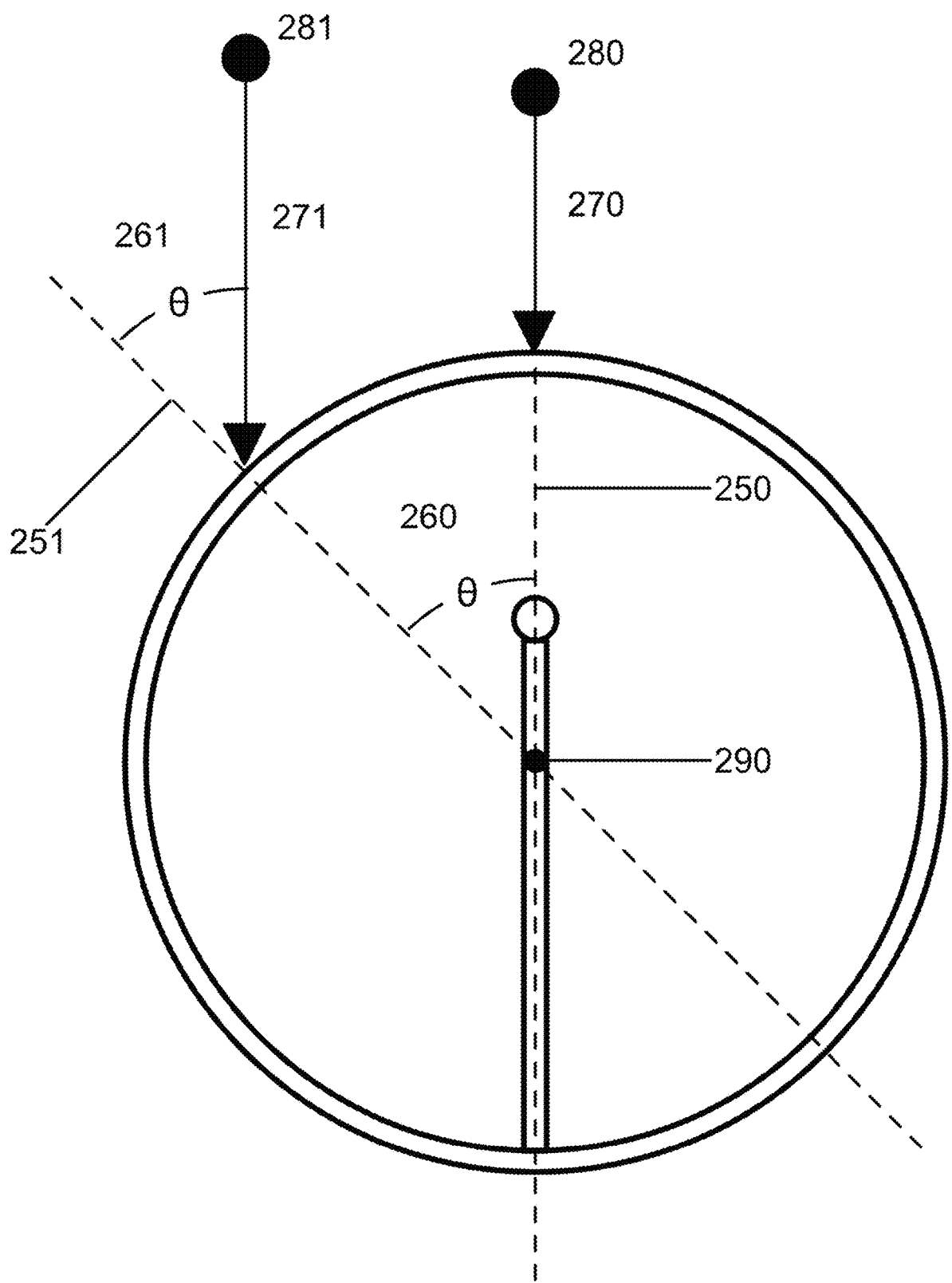
FIG. 2 is a schematic drawing showing a raindrop 280 and a raindrop 281 impacting an embodiment of a rain-sensing apparatus as described herein.

FIG. 2 shows the impact location and impact angle of a raindrop 280 impacting the sonde normal to the sonde surface and the impact location and impact angle of a raindrop 281 impacting the sonde at an angle of impact $\theta$ 261. A vector 270 comprises the direction of motion of raindrop 280 at the moment of impact of raindrop 280 with the sonde. Similarly, a vector 271 comprises the direction of motion of raindrop 281 at the moment of impact of raindrop 281 with the sonde. Intersections of vectors 270 and 271 with the sonde surface define the impact locations of raindrops 280 and 281, respectively. Axis 250 is normal to the sonde surface and passes through the location of impact of raindrop 280 and the sonde center 290. Axis 251 is normal to the sonde surface and passes through the location of impact of raindrop 281 and the sonde center 290. Raindrop 280 impacts the surface of the sonde normal to the sonde surface and therefore has an impact angle of 0° (zero degrees). Raindrop 281 impacts the surface of the sonde at an angle of impact $\theta$ 261. The angle of impact $\theta$ 261 is measured between the vector 271 comprising the direction of motion of raindrop 281 at the moment of impact of raindrop 281 and the axis 251 normal to the sonde surface at the impact site of raindrop 281. The same angle $\theta$ 260 is formed between the axis 251 normal to the sonde surface at the impact site of raindrop 281 and the vertical axis 250.

In embodiments comprising a spherical sonde, the spherical shape appears the same in all directions relative to impacting rain and thus the treatment of the impact geometry with respect to the sonde surface is the same regardless of impact location. Droplets can strike the sonde at an angle $\theta$ (e.g., $0 \leq \theta \leq 90°$) relative to an axis normal to the sonde surface at the location of impact, e.g., from normal to the surface (0°) to a glancing impact (approaching 90°).

Figure 3:
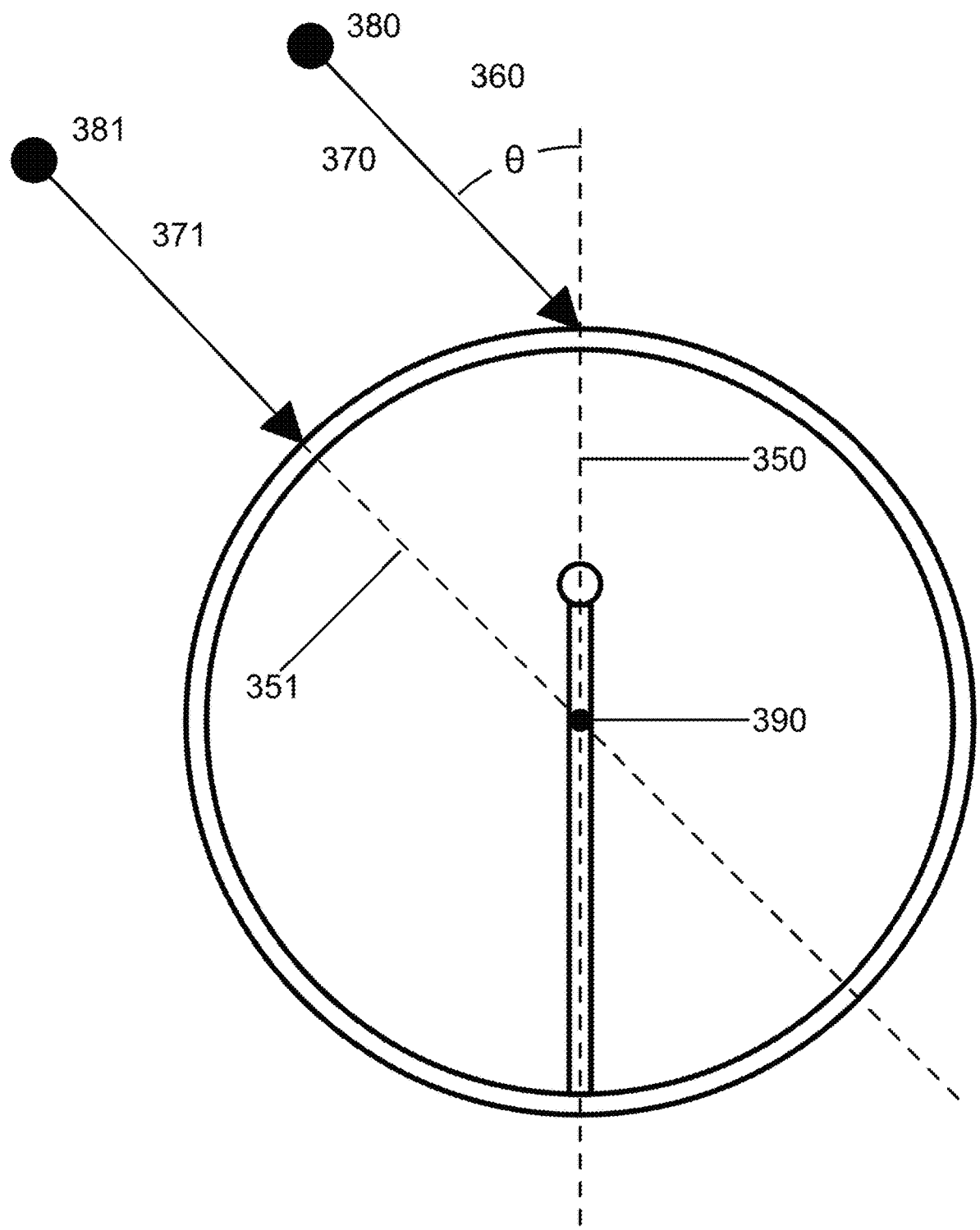
FIG. 3 is a schematic drawing showing a raindrop 380 and a raindrop 381 impacting an embodiment of a rain-sensing apparatus as described herein.

Accordingly, FIG. 3 shows measurements (similar to those in FIG. 2) associated with the impacts of a raindrop 380 impacting the sonde at an angle of impact $\theta$ 360 and a raindrop 381 impacting the sonde normal to the sonde surface. A vector 370 comprises the direction of motion of raindrop 380 at the moment of impact of raindrop 380 with the sonde. Similarly, a vector 371 comprises the direction of motion of raindrop 381 at the moment of impact of raindrop 381 with the sonde. Intersections of vectors 370 and 371 with the sonde surface define the impact locations of raindrops 380 and 381, respectively. Axis 350 is normal to the sonde surface and passes through the location of impact of raindrop 380 and the sonde center 390. Axis 351 is normal to the sonde surface and passes through the location of impact of raindrop 381 and the sonde center 390. Raindrop 381 impacts the surface of the sonde normal to the sonde surface and therefore has an impact angle of 0° (zero degrees). Raindrop 380 impacts the surface of the sonde at an angle of impact $\theta$ 360. The angle of impact $\theta$ 360 is measured between the vector 370 comprising the direction of motion of raindrop 380 at the moment of impact of raindrop 380 and the axis 350 normal to the sonde surface at the impact site of raindrop 380.

The impact location and impact angle of raindrops impacting the sonde affect the amount of impact energy transferred to the sonde and, consequently, affect the resulting acoustic signal detected by the microphone. Further, the impact energy transferred to the sonde is mediated by the hydrodynamics of the droplet and sometimes can be affected by water already existing (puddled) on the surface at that location. The impact energy mechanically shocks the sonde, which causes the sonde to vibrate and produce an acoustic vibration (ringing) inside the sonde volume. During experiments conducted during the development of embodiments of the technology described herein, it was contemplated that that an acoustic signal produced by the water itself could propagate into the sonde, but experimental data collected indicated that the acoustic signal inside the sonde is dominated by a single oscillation in the range of from approximately 6 to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz). Without being constrained by theory and with an understanding that the technology can be practiced without a complete understanding of the theory, this frequency range is contemplated to be a natural frequency of the spherical sonde, which acts similarly to a bell.

As noted above, the microphone is highly sensitive to acoustic signals in the characteristic frequency range produced by the sonde due to rain impacts, e.g., from approximately 6 to approximately 10 kHz (e.g., approximately 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 kHz). As noted above, the microphone produces an analog voltage proportional to the acoustic power. In some embodiments, the analog voltage is sampled at 32 kHz, 16-bits to produce a digital time varying signal. In some embodiments, the analog voltage is sample at 44.1 kHz. In some embodiments, the digital time varying signal provides a datastream that is analyzed in real time. In some embodiments, the datastream is analyzed by a component of the apparatus configured to compute statistical parameters that correspond to rain and characterize rain. Experiments conducted during the development of embodiments of the technology indicated that the sampling rate is chosen to extract useful information from the approximately 6-10 kHz carrier frequency, while minimizing the computational load and power consumption when analyzing the signal.

Example 3—Acoustic Signature of Rain

During the development of embodiments of the technology described herein, experiments were conducted to develop a characteristic signature of a rain drop impact on the sonde of a rain detection apparatus according to the technology as described herein. A rain device was developed to produce rain drops of a specified size and frequency. During experiments conducted during the development of embodiments of the technology, the rain device was used to produce a series of nearly identical rain droplets with a frequency of 1 Hz. The test droplets had a diameter of 2.419±0.089 mm (variation of 3.70%) and a mass of 7.41±0.82 mg (variation of 11.00%). The rain droplets impacted the sonde at the same location on the sonde surface, which was the "north pole" of the sonde where the vertical axis intersects the sonde surface. The drops fell onto the sonde from a height of 1.2 m from the surface of the sonde. A microphone positioned inside the sonde was used to record the acoustic signal, which was continuously sampled at 32 kHz.

Figure 4A:
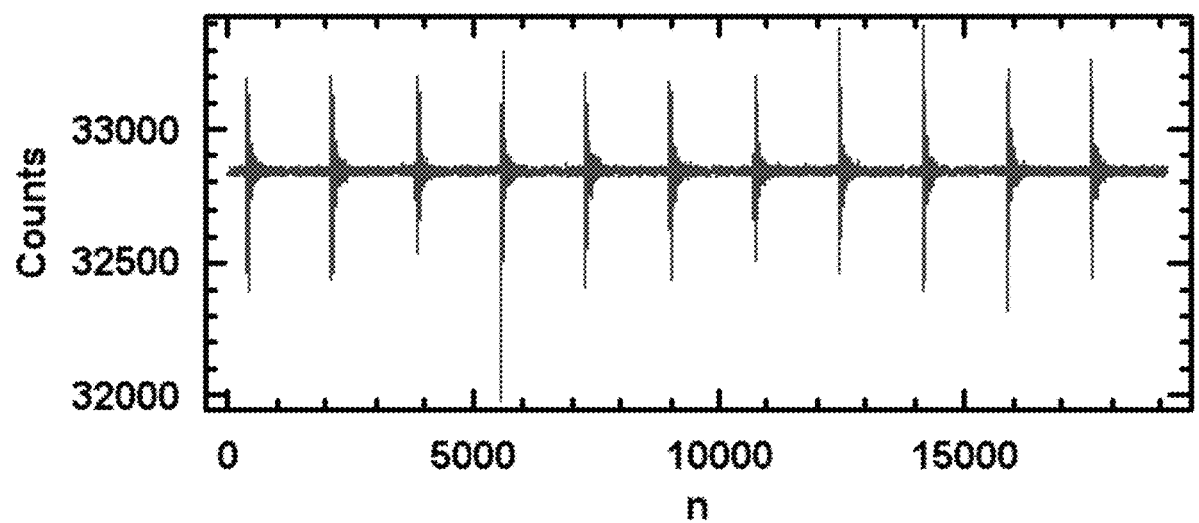
FIG. 4A is a plot showing the acoustic signal (arbitrary units measuring microphone signal) versus time for a series of rain drops impacting the sonde of a rain detection apparatus according to the technology as described herein. The acoustic signal was recorded by a microphone inside the sonde as described herein. The rain droplets were released from a height of 1.2 m and impacted the sonde at a frequency of 1 Hz at the "north pole" of the sonde (e.g., where the vertical axis intersects the sonde surface). The test droplets had a diameter of 2.419±0.089 mm (variation of 3.70%) and a mass of 7.41±0.82 mg (variation of 11.00%).
Figure 4B:
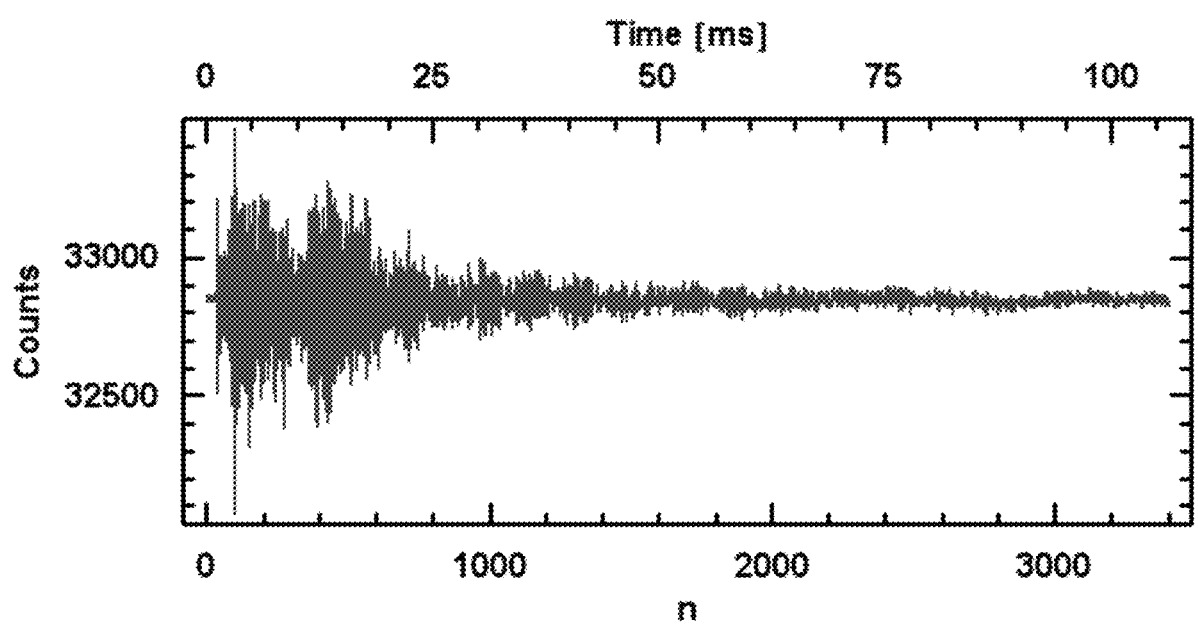
FIG. 4B is a plot showing a single pulse from FIG. 4A.

The drops produced a train of sharp spikes with amplitude well above the background noise level (FIG. 4A). Closer examination of the signal of a single pulse indicated that the signal abruptly increased, followed by a damped oscillation occurring over approximately 100 milliseconds (FIG. 4B). The oscillation had a strong primary frequency, e.g., corresponding to the natural frequency of the sonde shell. Data collected during the testing of different sonde weldments indicated that the primary frequency signature of the sondes varied from about 6-10 kHz.

Figure 4C:
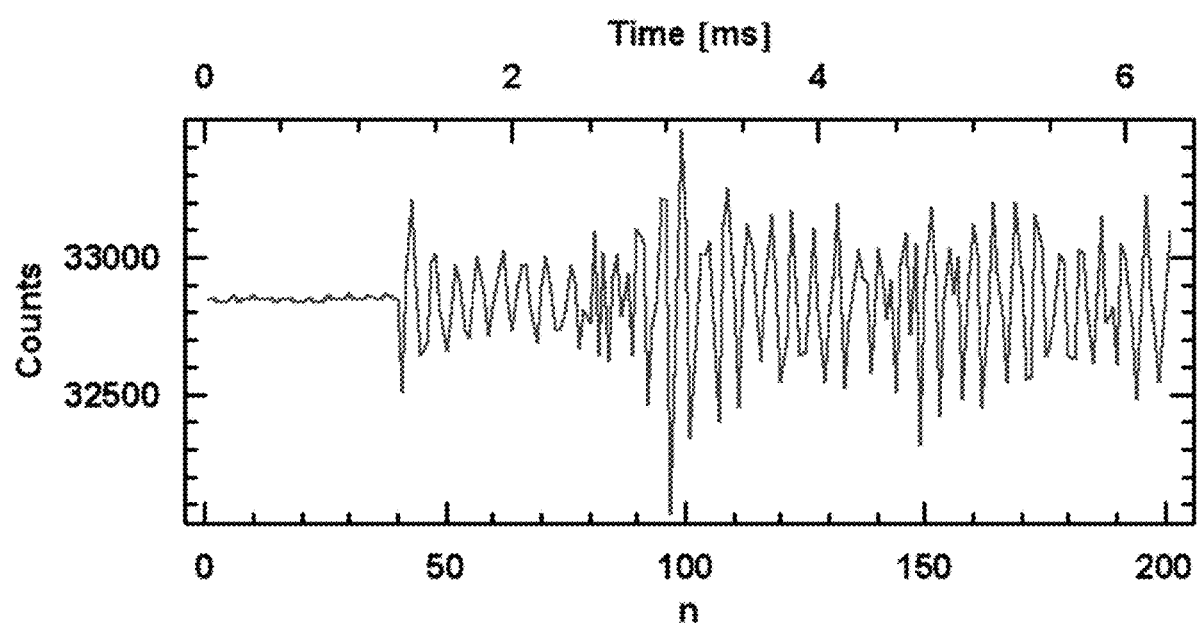
FIG. 4C is a plot showing the fine structure of the signals shown in FIG. 4A and FIG. 4B.

As a damped oscillation, the data indicated that the signal reduced gradually over approximately 100 milliseconds. Further analysis indicated that the data had a finer structure comprising an amplitude modulation (AM) of the primary ring frequency (FIG. 4C). Analysis of the data indicated that the signal comprises a characteristic AM signature comprising components that correlate with various parameters of individual impacting drops such as droplet size and position of the droplet strike on the sonde surface.

During the development of the technology described herein, two primary parameters were developed to characterize the acoustic signature of a single drop impact: peak acoustic power (P-value) and acoustic energy ($E_a$).

Figure 5:
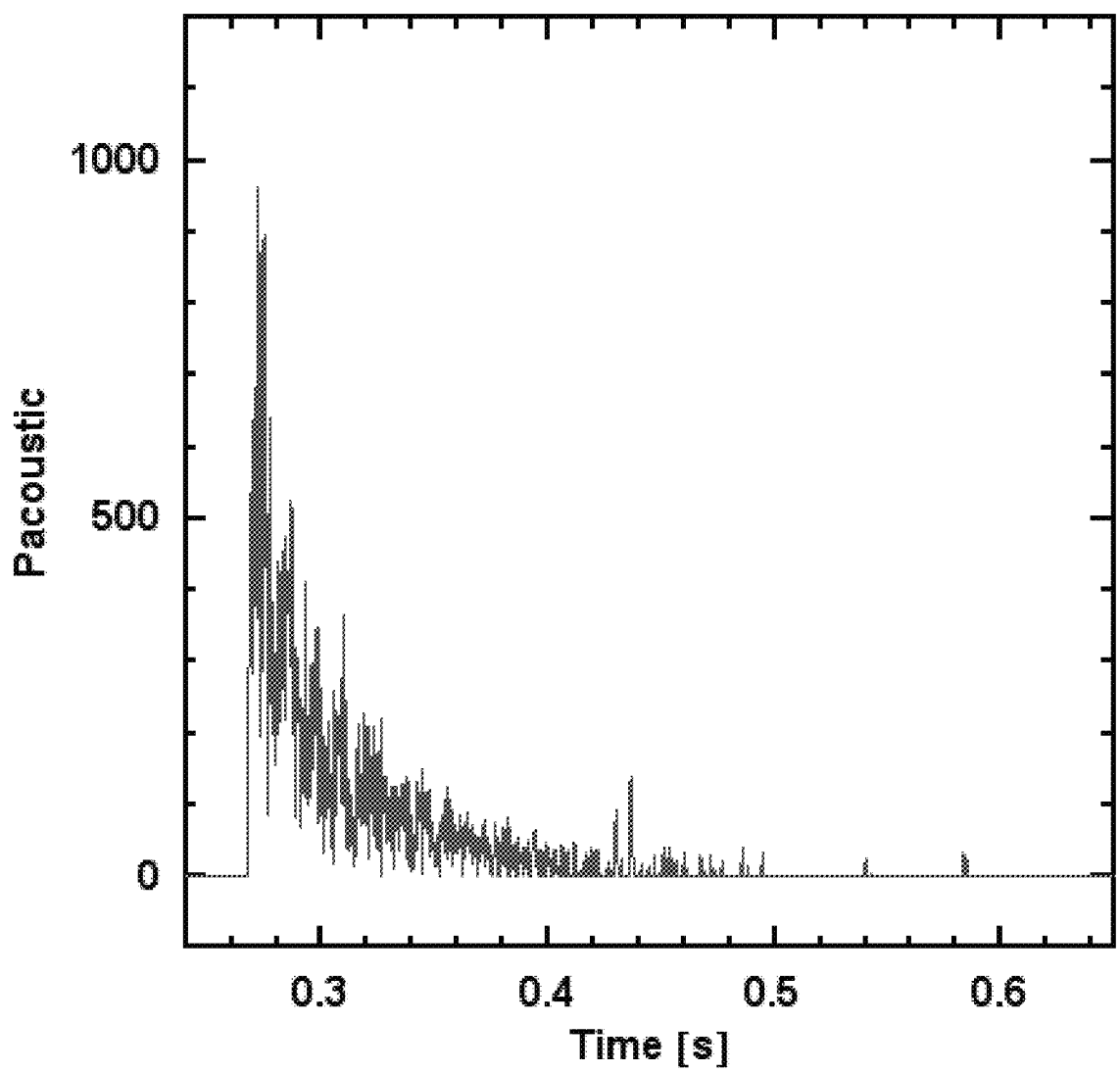
FIG. 5 is a plot of the acoustic power ($P_a$) versus time for a single drop impacting the sonde of an apparatus as described herein. The acoustic power provides one acoustic signature of a single rain drop impacting an embodiment of the apparatus described herein. The peak excursion of the acoustic power derived from the audio signal is referred to as the "P-value".
Figure 6:
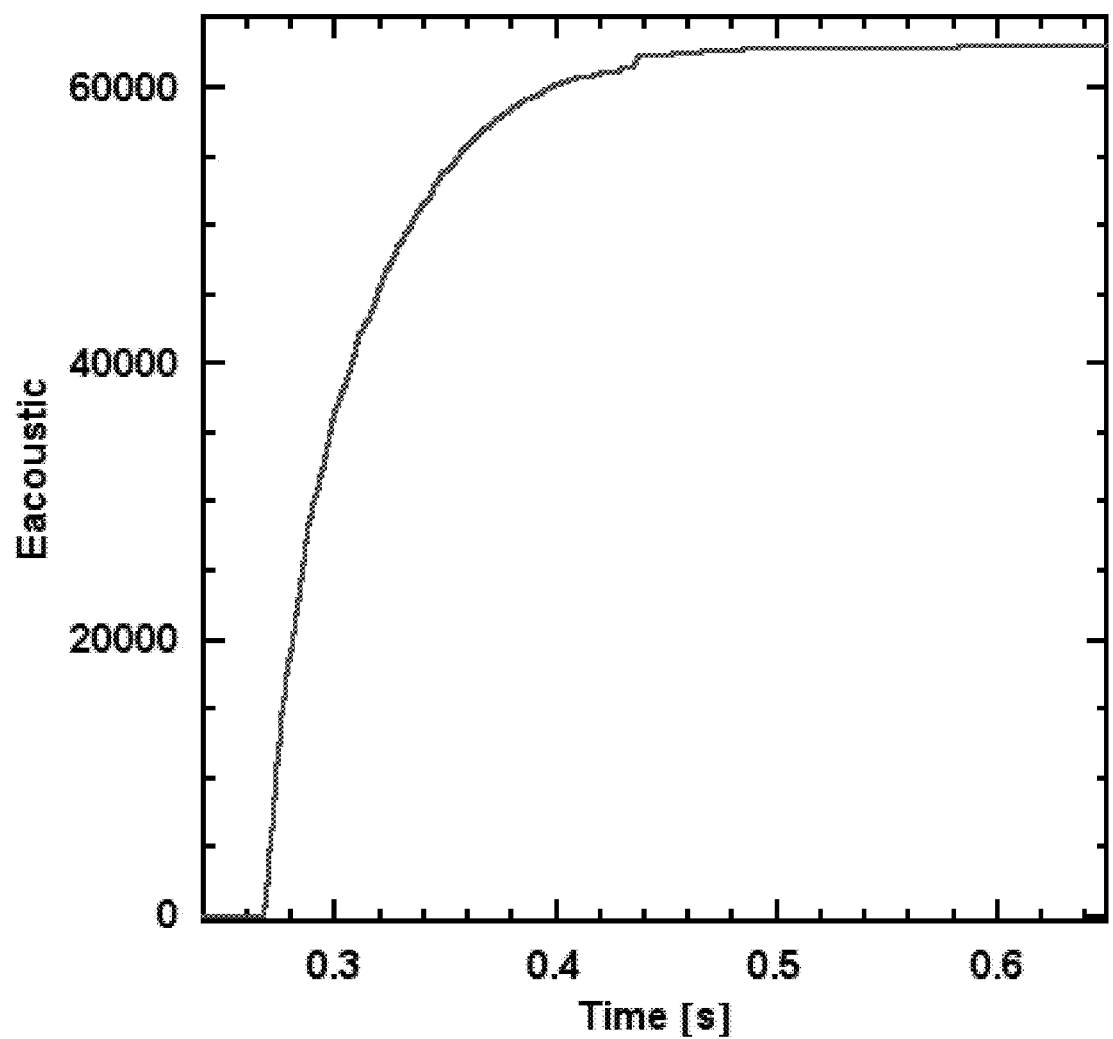
FIG. 6 is a plot of the Acoustic energy ("$E_a$", numerical summation of the acoustic power signal from a single drop impact, or generally over a period of time) versus time for a single drop impacting the sonde of an apparatus as described herein. The acoustic energy shown in FIG. 6 ($E_a$) provides one acoustic signature of a single rain drop impacting an embodiment of the apparatus described herein.

The peak acoustic power (P-value) is defined as the peak excursion of the acoustic power derived from the audio signal. As shown in FIG. 5, the raw (AM) acoustic signal was transformed to provide a demodulated signal with positive values corresponding to the instantaneous amplitude of the primary ring oscillation. The peak acoustic power (P-value) is the peak of this function. For the data collected and shown in FIG. 5, the P-value was 970 counts. Data collected during these experiments indicated that the peak did not typically occur at the moment of the drop impact, which is what would have been expected from an ideal damped oscillatory system. The difference is due to the microphone recording and/or acquiring the acoustic signal inside the sonde (e.g., air) volume and not the direct mechanical vibrations of the sonde shell itself.

Figure 10A:
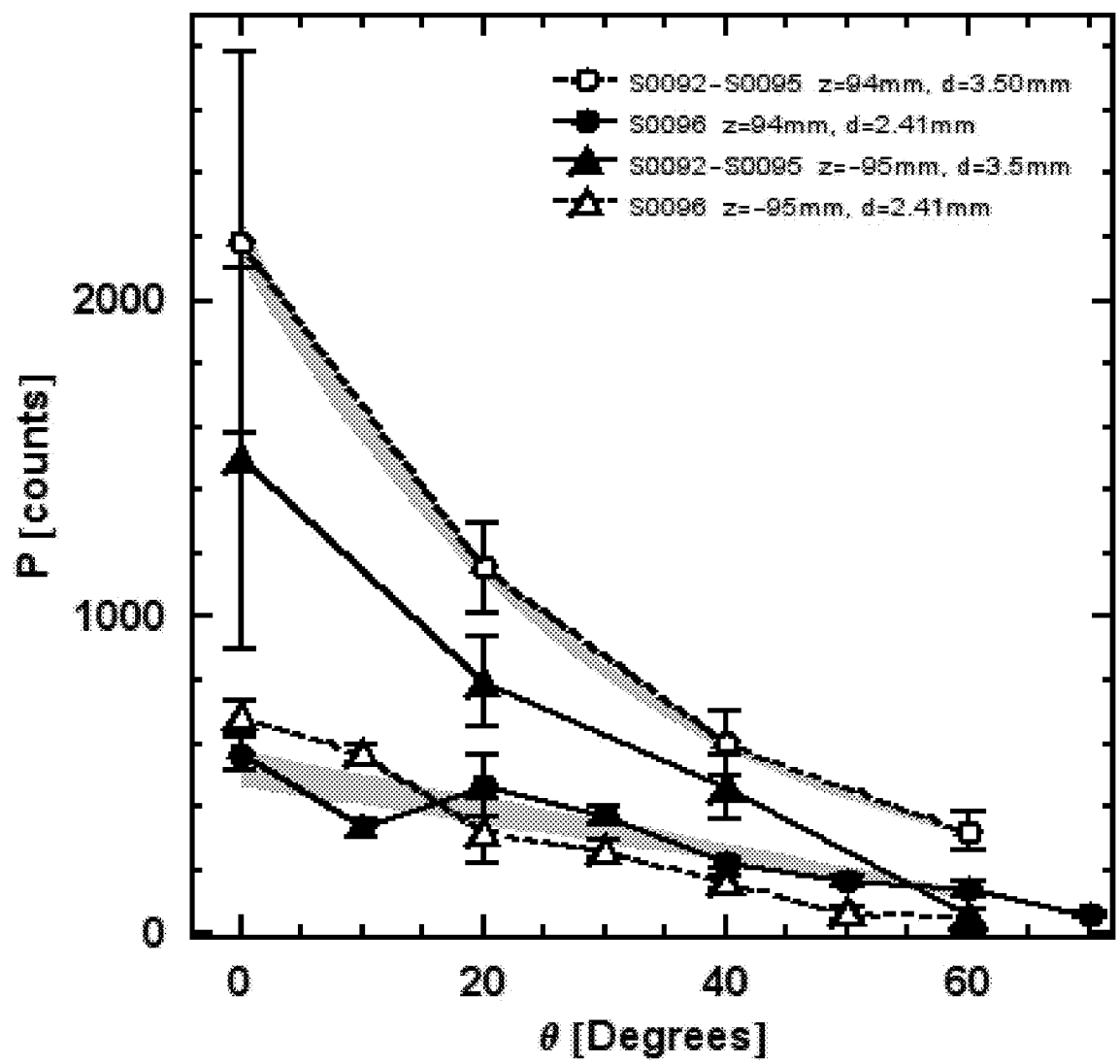
FIG. 10A is a plot of peak acoustic power (P-value) versus impact angle (θ=0, 20, 40, and 60 degrees from normal to the surface; see FIG. 2 and FIG. 3) for drops of different sizes (2.41 mm and 3.50 mm).
Figure 10B:
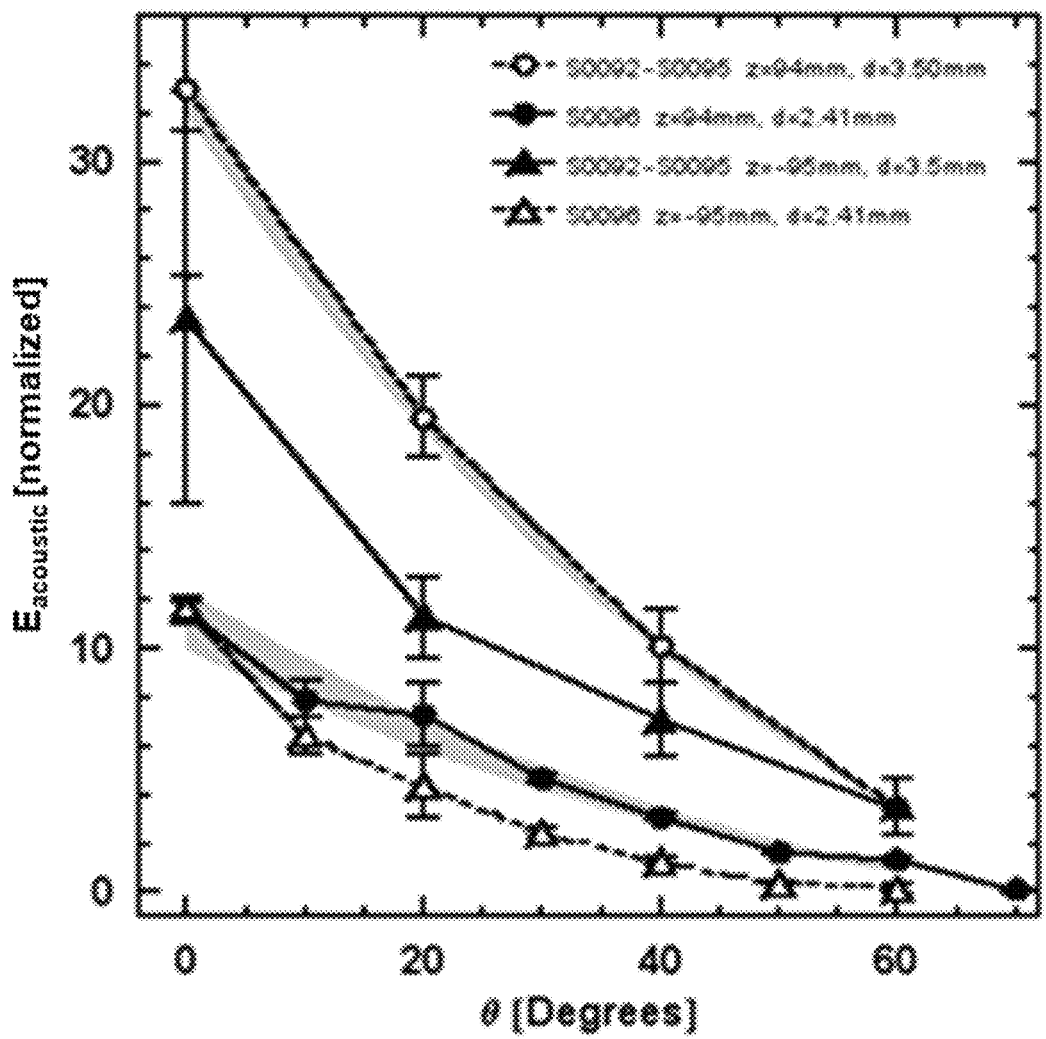
FIG. 10B is a plot of acoustic energy ($E_a$) versus impact angle (θ=0, 20, 40, and 60 degrees from normal to the surface; see FIG. 2 and FIG. 3) for drops of different sizes (2.41 mm and 3.50 mm) and microphone placements (94 mm or −95 mm).

Numerical summation of the acoustic power signature of a single drop impact produces a curve that rapidly rises to an asymptotic value corresponding to the total acoustic energy ($E_a$) associated with the drop impact. Plots of $E_a$ versus position of drop impact on the sonde for varying drop sizes were constructed (see, e.g., FIG. 10B). In an ideal damped oscillator, the energy is completely determined by the peak value and the decay constant. However, the data collected indicated that, in embodiments of the apparatuses described herein, this correlation is not always fixed and appears to be affected by the impact geometry, position, and hydrodynamics. Accordingly, the acoustic energy ($E_a$) provides additional information about the strike that is not captured by the peak acoustic power analysis.

Example 4—Signal Processing

During the development of embodiments of the technology described herein, methods were developed to analyze the acoustic signal from raindrop impacts on a sonde. In particular, embodiments of the rain measurement method provided herein comprise obtaining an acoustic signal from raindrop impacts on the sonde (e.g., obtained by a microphone), digitizing the acoustic signal, and processing the digitized acoustic signal. As discussed herein, the raw 32-kHz signal for a single drop is similar to a damped oscillation at the primary ring frequency specific to the sonde.

Figure 7:
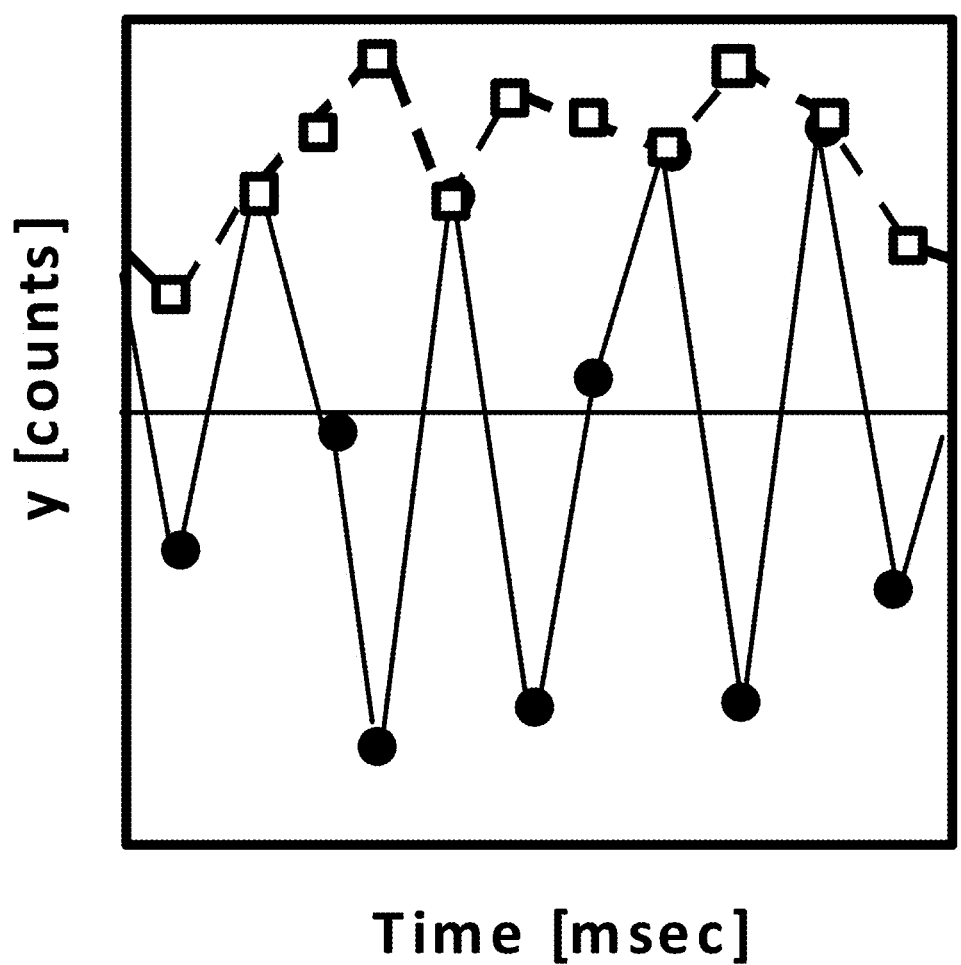
FIG. 7 is a plot showing demodulation of acoustic power (black dots). The absolute values of peaks are identified and intermediate points are estimated by interpolation (white dots).

The first data processing step is demodulating the amplitude modulated (AM) signal. The AM signal is a real-time digital signal; thus, the demodulation is continuously applied to discrete points (FIG. 7, black dots), e.g., using a running method. The algorithm looks forward in time, identifying peaks in the absolute value of signal intensity (e.g., abs($y_i$)). Intermediate points are estimated by interpolation between known peaks (FIG. 7, white dots), e.g., according to Equation 1;

$$p_{i1} = y_{i0} + \frac{(y_{i2} - y_{i0})(i_1 - i_0)}{(i_2 - i_0)} \quad (1)$$

In Equation 1, the $p_{i1}$ are the interpolated points determined by the analysis, $y_{i0}$ is the previously identified peak at $i_0$, $y_{i2}$ is the next identified peak at $i_2$, and the current index is $i_1$.

Figure 8:
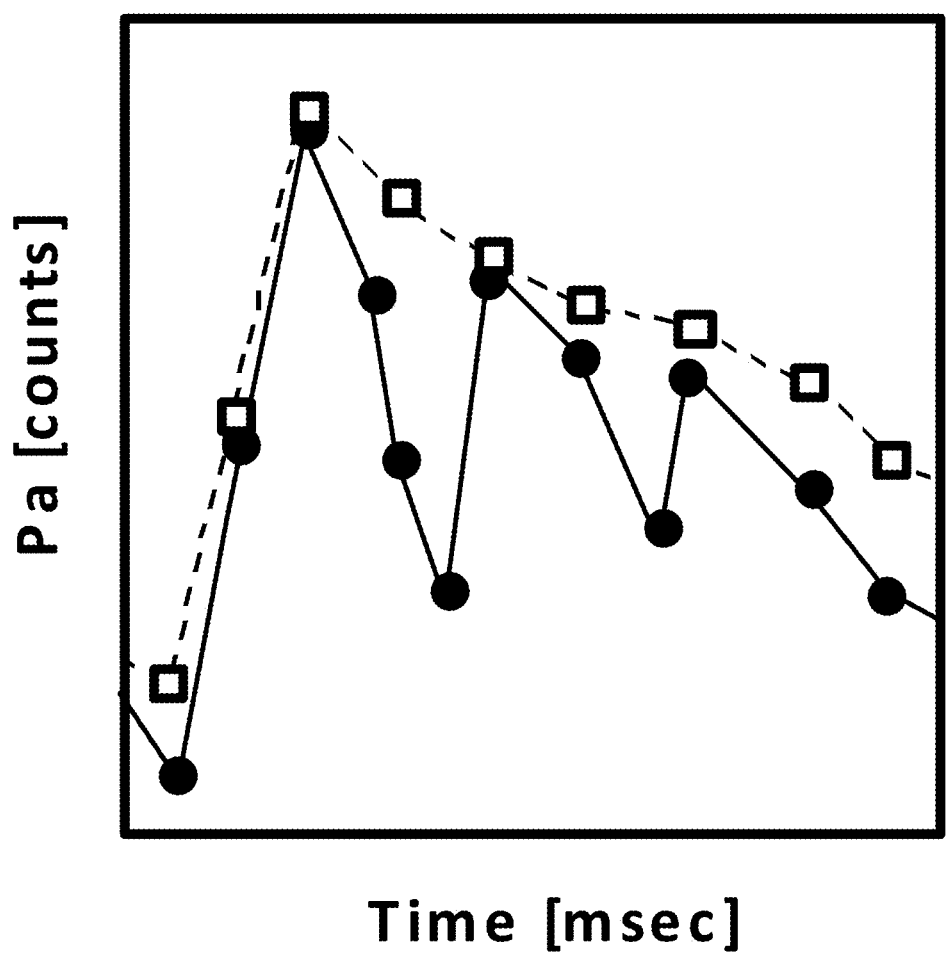
FIG. 8 is a plot showing transformation of the demodulated signal by an envelope ("airplane") filter. The demodulated signal is shown in black dots and the signal after transformation by the envelope filter is shown in white dots.

The second data processing step comprises use of an envelope (e.g., "airplane") function, e.g., applied as a running calculation on the real-time signal. As shown schematically in FIG. 8, a new series is generated from the previously demodulated signal, e.g., according to Equation 2.

$$q_{i+1} = q_i + \Delta q = q_i + \begin{cases} (y_{i+1} \geq q_i) \to f_c(y_{i+1} - q_i) \\ (y_{i+1} < q_i) \to f_g(y_{i+1} - q_i) \end{cases} \quad (2)$$

In Equation 2, i is the previously calculated index and i+1 is the new index to be calculated.

The new series climbs over each rise, then glides past the peak, smoothing out subsequent structure on the back side of the peak. The climb and glide functions $f_c$ and $f_g$ can be of any form and adjusted independently. During the development of embodiments of the technology described herein, $f_c$ was adjusted to allow a sharp climb to preserve the initial peak (P-value) and $f_g$ was an exponential form with a time constant on the order of approximately 1 to approximately 10 milliseconds (e.g., approximately 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 milliseconds).

The airplane filter is designed to preserve both the P-value and acoustic energy ($E_a$) of individual raindrop impacts. In some embodiments using a short glide, the fine (e.g., approximately 1-3 Hz) structure in the oscillation is preserved, which contains additional information about impact positions and water puddling. In some embodiments using a long glide, this fine structure is removed. A long glide function allows the sample to be downsampled to approximately 3.2 Hz (e.g., approximately 2.5 to 4.0 Hz (e.g., approximately 2.5, 2.6, 2.7, 2.8, 2.9, 3.0, 3.1, 3.2, 3.3, 3.4, 3.5, 3.6, 3.7, 3.8, 3.9, or 4.0 Hz)), while still preserving the P-value and $E_a$ parameters.

Example 5—Determining Rain Rate

During the development of embodiments of the technology described herein, experiments were conducted to determine rain rate using embodiments of the rain sensor technology described. In some embodiments, the rain measurement system uses a microphone placed inside a spherical sonde in the top of the unit. Then, in some embodiments the microphone records the audio signal of raindrops striking the exterior of the sonde. Accordingly, each strike by a single droplet produces a characteristic pulse (see, e.g., FIGS. 4A, 4B, and 4C). Then, in some embodiments, the real-time audio signal is preprocessed and downsampled to extract the envelope of the each pulse. During the development of embodiments of the technology disclosed herein, experiments were conducted to evaluate the relationship between the pulse parameters determined by the analysis described herein with droplet size and droplet position.

During a rain event, hundreds of drops can strike the sonde every second. This rate of drops impacting the sonde may result in a superposition of individual pulses and, consequently, distinguishing and measuring individual droplet strikes is difficult. Thus, in some embodiments of the technology described herein, rain rate measurement is based on a statistical correlation between parameters in this aggregate signal and rain rate.

During the development of embodiments of the technology described herein, experiments were conducted to analyze single drop strikes and to evaluate microphone placement within the apparatus. In particular, experiments were conducted using a train of single droplets that impacted the top of a sonde and the acoustic signal from drop impact was recorded with a microphone inside the device.

During these experiments, the vertical placement of the microphone on the Z-axis of the sonde was varied and data were recorded from at least ten droplet strikes impacting the sonde at different strike angles (9) relative to the top. The data were filtered and analyzed to extract the peak (P-value) amplitude and acoustic energy ($E_a$). The mean P-values were plotted against the vertical position of the microphone in the sonde. See, e.g., FIG. 9.

Figure 9:
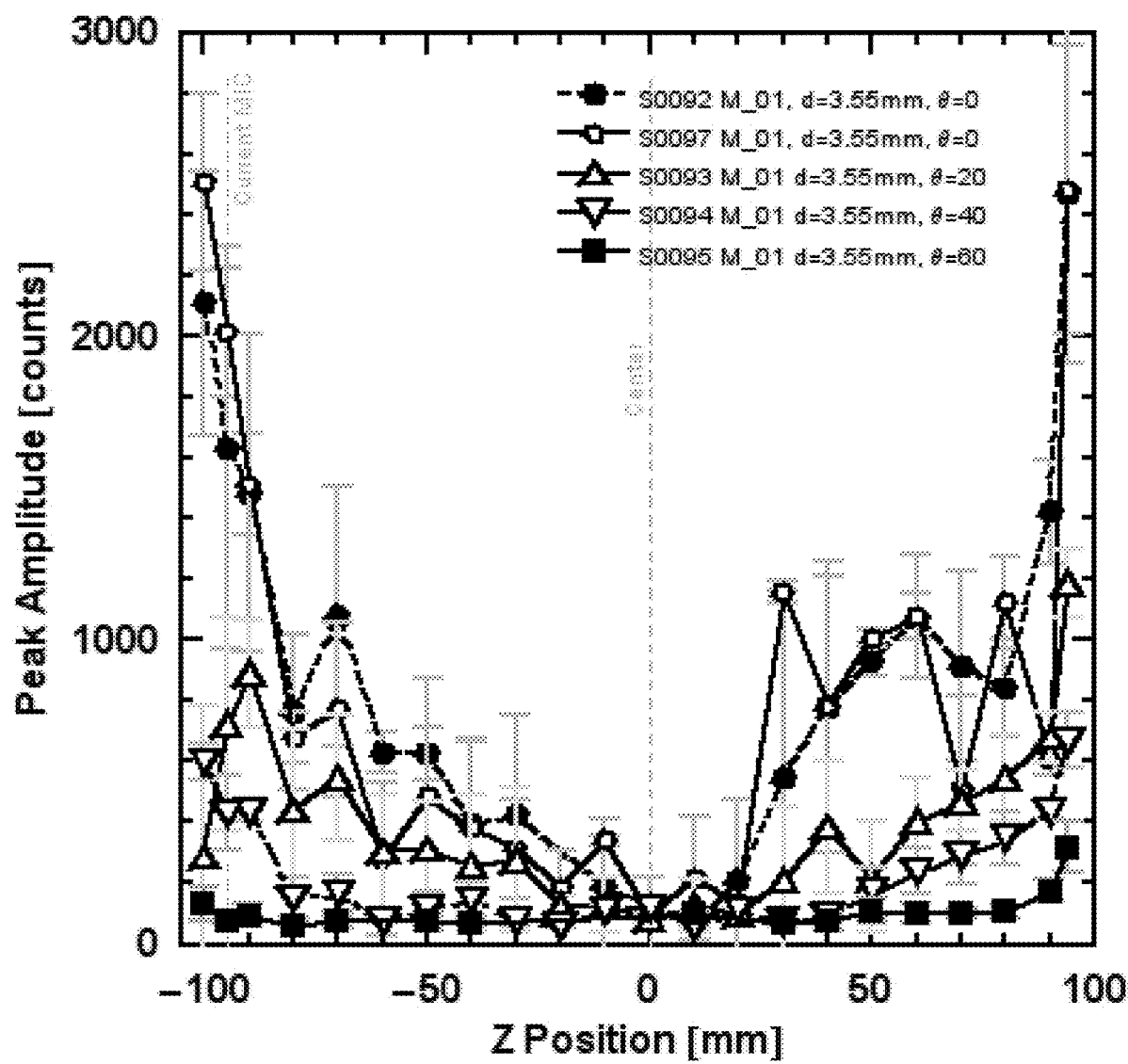
FIG. 9 is a plot of peak acoustic power (P-value) versus microphone position for single 3.55-mm droplets impacting the sonde at various angles (θ=0, 20, 40, and 60 degrees from normal to the surface; see FIG. 2 and FIG. 3). The microphone was positioned on the Z-axis at various distances (in mm) below (− values) and above (+ values) the equator (see, e.g., FIG. 1).

The data plot in FIG. 9 indicated that the audio signal varied considerably with microphone location. For instance, the signal was strongest near the top of the sonde (e.g., at Z=100 mm), but the signal varied widely from strike to strike and showed the greatest variation among individual sondes. The signal was similarly strong near the bottom, but the signal was also variable. The signal was almost zero near the center of the sonde. This behavior was attributed to the acoustic wave mode structure inside the sonde. After much investigation, a microphone position at Z=50 to 70 mm (e.g., 50, 51, 52, 53, 54, 55, 56, 57, 58, 59, 60, 61, 62, 63, 64, 65, 66, 67, 68, or 70 mm) was selected as the location balancing signal strength and quality. Accordingly, in some embodiments, the microphone is placed on the center vertical axis of the sonde, 50-70 mm above the equator, and approximately in the center of the northern hemisphere. Here the signal is moderately strong, but relatively stable, and did not vary much from sonde to sonde.

After locating the position of the microphone providing high signal strength and quality, additional experiments were conducted during the development of embodiments of the technology to measure the signal dependence on droplet size and strike position on the sonde (relative to the top of the sonde), which are both key inputs to develop a rain rate correlation function. Peak acoustic power (P-value) and acoustic energy ($E_a$) were plotted as a function of the strike position of droplets on the sonde. See, e.g., FIGS. 10A and 10B, respectively, for P-value and $E_a$ plots. Data were collected for drops of different sizes. See, e.g., FIGS. 10A and 10B.

The data indicated that both the P-value and $E_a$ decreased as the droplet size was decreased from 3.5 mm to 2.4 mm. The data also clearly indicated that droplets of a particular size produced a proportionally smaller signature as the strike position of droplets on the sonde was varied from 0 to 60 degrees (relative to the top of the sonde). These data indicated that the technology resolves droplet size and strike position on the sonde, but that droplet size and strike position on the sonde are not independent quantities. Accordingly, this interdependence of droplet size and strike position and the relationship of the acoustic signal to both variables limits direct measurement of rain rate by counting individual droplets. Thus, embodiments of the technology instead measure rain rate according to a correlation that statistically averages droplet signatures.

As discussed herein, hundreds of hydrometeors (e.g., rain) can impact the sonde per second during a rain event, which can result in a superposition of strike signatures. For example, during the development of the technology herein, acoustic signatures recorded by an embodiment of the technology provided herein were simulated for rain rates of 2 mm/hour (FIG. 11A), 10 mm/hour (FIG. 11B), and 100 mm/hour (FIG. 11B). Although individual strikes were observable, they often overlapped and many small strikes were not sufficiently resolved. Further, experiments conducted during the development of the technology provided herein indicated that the acoustic signature was dependent on both droplet size and strike position.

In some embodiments, data collected during the development of embodiments of the technology indicated that statistically averaged quantities associated with the real-time acoustic signal provide a measure of rain rate. For example, in some embodiments the technology comprises applying statistical treatments to the time-varying acoustic power signal to obtain a measure of rain rate. For example, in some embodiments, the technology comprises determining statistical parameters from a distribution of the time-varying acoustic power signal (e.g., peak height, frequency in various frequency bands, mean amplitude, shape and length of the tail of the distribution, shape of the distribution, etc.)

Figure 11A:
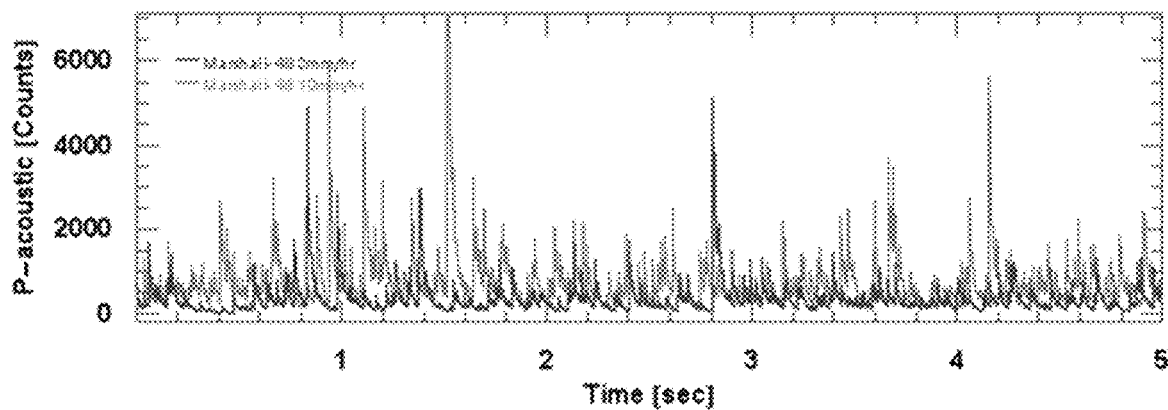
FIG. 11A is a plot of the simulated acoustic power ($P_a$) as a function of time for constant rain rates of 2 mm/hour and 10 mm/hour. The signal shows peaks for individual rain drop impacts recorded by the device.
Figure 11B:
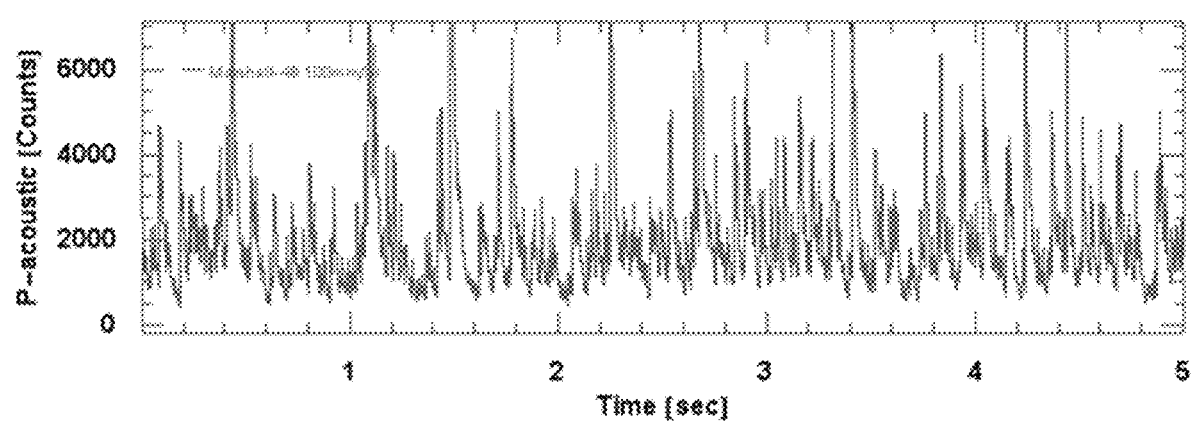
FIG. 11B is a plot of the simulated acoustic power ($P_a$) as a function of time for a constant rain rate of 100 mm/hour. The signal shows peaks for individual rain drop impacts recorded by the device.

In particular, in some embodiments, a method is used in which the $y_i$ values of the filtered acoustic power signal (P-Acoustic, e.g., as shown in FIG. 11A and FIG. 11B) are collected and analyzed (e.g., to extract statistical parameters providing a measure of rain rate). Data collected during the development of embodiments of the technology indicated that the distribution of $y_i$ values changed as a function of rain rate. In particular, the distribution broadened and moved toward higher P-Acoustic values as the rain rate increased. Analysis of the raw acoustic signal (see, e.g., FIGS. 11A and 11B) indicated that the change in the distribution was caused by an increased number of spikes of high amplitude for higher rain rates and an accompanying increase in the signal baseline caused by the superposition of multiple, numerous strikes at the higher rain rate.

In some embodiments, a method is used in which the filtered acoustic power signal (P-Acoustic, e.g., as shown in FIG. 11A and FIG. 11B) is analyzed using a peak-finding algorithm. In some embodiments, this algorithm identifies individual peaks and their time of occurrence and amplitude (P-value). In some embodiments, the peaks are appropriately corrected for superposition effects. Then, in some embodiments, the technology comprises applying statistical treatments to a distribution of peak attributes (e.g., peak height, time of occurrence) of the peaks in the peak dataset. During the development of embodiments of the technology described herein, peak data (time of occurrence and amplitude) were collected for different (simulated) constant rain rates and statistically treated). The data indicated that P-values increase as a function of increasing rain rate.

Example 6—Rain Rate Correlation

As described above, in some embodiments, rain measurement methods provided herein comprise applying a statistical analysis to the acoustic power signal recorded by a microphone inside the sonde. In some embodiments, the signal is filtered and analyzed over fixed time intervals. In some embodiments, a number of parameters is calculated from a distribution of raw acoustic power signal data or filtered acoustic power signal data, e.g., peak height, characteristic width, and/or frequency of occurrence within various bands. Over a sufficient measurement time, one can derive a blended acoustic parameter incorporating multiple characteristics of the acoustic power distribution that minimizes error per sampling period.

During the development of embodiments of the technology provided herein, experiments were conducted in which statistical parameters were calculated for rain rates recorded by an apparatus as described herein. Data collected during these experiments and subsequent data analysis indicated that the blended acoustic parameter and the P-value are correlated to rain rate. Accordingly, experiments were conducted during the development of embodiments of the technology provided herein to collect rain rate data and develop a correlation function for rain rate using the blended acoustic parameter and P-value. In addition, experiments were conducted during the development of embodiments of the technology provided herein to collect rain rate data and develop a correlation function for rain rate using the P-value distribution.

During the development of embodiments of the technology provided herein, experiments were conducted to develop a correlation function by comparing acoustic signal derived parameters (e.g., the acoustic parameter) for rain impacting an apparatus as described herein to the rain rate measured by a disdrometer co-located outdoors with the apparatus. The co-located apparatus and disdrometer collected data during a rain event, with suitable precautions taken concerning spacing, wind effects, etc. During these experiments, the blended acoustic parameter calculated from data collected by the sonde over the time interval was plotted against the rain rate as measured by the disdrometer for the same time interval. Analysis of the data indicated that a power law function described the relationship between the blended acoustic parameter calculated according to the technology described herein and the disdrometer data.

Figure 12:
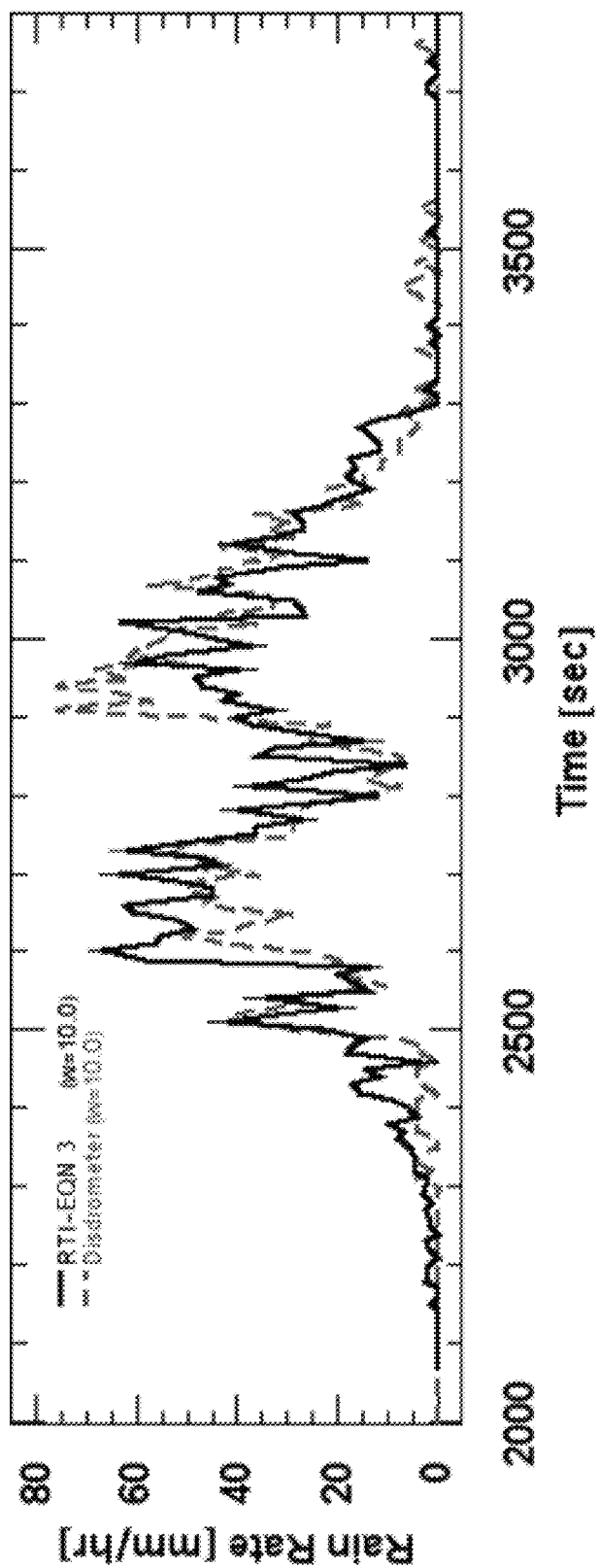
FIG. 12 is a plot of rain rate versus time for rain rate determined using a power law function and the acoustic signal processed as described herein (solid line) and the rain rate as determined by a disdrometer (dashed line).
Figure 13:
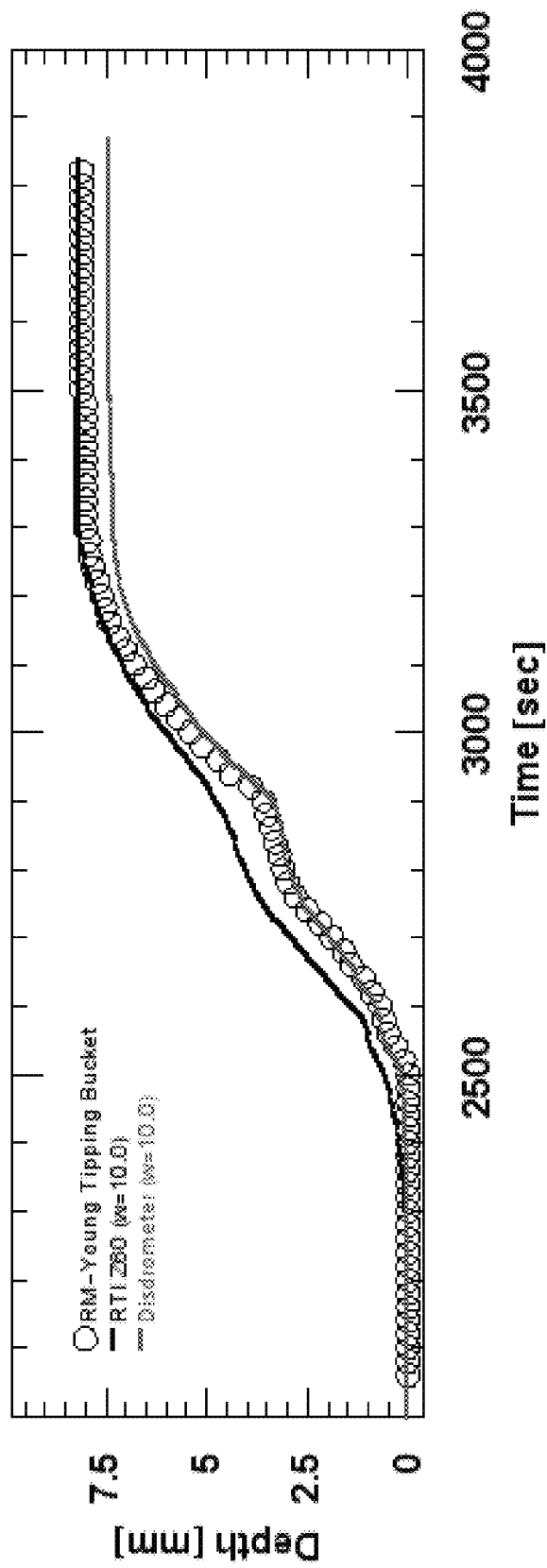
FIG. 13 is plot of cumulative rain measured over time as determined using the power law function and the acoustic signal processed as described herein (black line) and the rain rate as determined by a disdrometer (grey line) and a tipping bucket rain gauge (circles).

During the development of the technology described herein, these data were analyzed to determine the best-fit parameters for the power law correlation. As a result, the technology provides a method to measure (e.g., estimate) the instantaneous rain rate directly from the microphone acoustic signal. In particular, experiments were conducted during the development of embodiments of the technology described herein in which the rain rate determined by a disdrometer for a rain event was compared to the instantaneous rain rate calculated for the same rain event using the acoustic signal from an apparatus as described herein and the power law parameters determined from the analysis described above (FIG. 12). The estimated rain rate calculated using the acoustic signal and the power law parameters matched the data recorded by the disdrometer (FIG. 12). Furthermore, determining the cumulative rain fall using the acoustic signal and the power law parameters also agreed with the data collected by a disdrometer and a co-located tipping bucket rain gauge (FIG. 13).

Accordingly, provided herein is a technology for estimating the instantaneous rain rate using an apparatus as described herein, e.g., comprising a sonde and a microphone placed inside the sonde. While, in some embodiments, individual rain droplet strikes and sizes are less resolved during rain events, embodiments comprise use of statistical methods and a correlation function to yield a useful quantitative measure of rain rate and rain accumulation.

Example 7—Variability of Rain Types

Droplet size distributions can vary significantly depending on the weather conditions from which rain emerges. For instance, observed droplet size distributions for different types of rain calculated at 10 mm/hour steady rate have a mean droplet diameter ranging from 0.5 to 1.6 mm. See, e.g., Ulbrich, (1983) "Natural variations in the analytical form of the raindrop size distribution" Journal of Climate and Applied Meteorology 22: 1764. Furthermore, the population of large droplets (e.g., above 2.5 mm) can vary widely. (Id). These data indicate that different rain types (e.g., having a range of volume distributions from approximately 0 to approximately 1 $cm^3/m^3$/mm and a droplet diameter ranging from approximately slightly more than 0 (e.g., 0.05, 0.1, 0.2, 0.3, 0.4, 0.5 mm) to 5 mm and, according to some observations, as large as approximately 6 mm) affect the amplitude and statistical character of the microphone acoustic signal. Accordingly, in some embodiments a statistical parameter (and correlation function) that is minimally affected by these differences accurately estimates rainfall under all conditions and rain types.

Example 8—Wind Correction and Calibration

As shown by the data collected during experiments conducted and described herein, a correlation function based on the acoustic parameter accurately measures rain rates. In particular, the methods for measuring rain rate provided herein provide similar measures of rain rate as a disdrometer and tipping bucket standard. However, differences in the acoustic responses of different sondes and/or different microphones may exist between different rain-sensing apparatus units. Without being bound by any particular theory, it is contemplated that variability can be due to many things, including mechanical and structural aspects of the sonde (which acts similar to a bell) and electronic characteristics of the circuit components. Improved design and manufacturing techniques can reduce this variability, but it is likely that some sensitivity differences will remain in these manufactured units.

Calibrating individual apparatuses to a standard is considered impractical, e.g., because collecting real rain data in a large volume manufacturing environment is not efficient and it is difficult to generate acoustic inputs or develop indoor "rain" chambers that closely match real rain. For this reason, in some embodiments the technology provides an apparatus as described herein that performs self-calibration, e.g., when deployed for measurement at the measurement site.

For instance, in some embodiments an apparatus as described herein is calibrated against standards to yield a correlation function that accurately predicts rain. Experiments performed during the development of embodiments of the technology indicated that the primary differences in signal output between apparatus units result from the sonde response and/or microphone measurement. Accordingly, in some embodiments, a real-time and/or post-processing numerical (or analytical) transformation converts the raw datastream to a datastream that measures the rain rate more accurately.

In particular, in some embodiments, the technology comprises correcting drop characteristics (e.g., drop velocity, momentum, size, volume, etc.) due to wind. As discussed herein, in some embodiments, the rain sensing apparatus is integrated into a weather-sensing device as described in U.S. Pat. Nos. 9,846,092 and 9,958,346, each of which is incorporated herein in its entirety. In some embodiments, the weather-sensing apparatus measures wind velocity (e.g., speed and direction) and detects individual hydrometeors (e.g., hail).

In some embodiments, the acoustic energy (e.g., the sum of the absolute value of the sound recorded by the transducer) of rain is approximated as a linear response with respect to the rain volume impacting the rain detector described herein. In general, the distribution of drop sizes and the distribution of drop speeds produced by a rain event (e.g., a rain storm) do not vary substantially among rain events. That is, rain events produce rain having a distribution of drop sizes and a distribution of drop speeds that does not vary substantially from rain event to rain event. Accordingly, the volume of rain (e.g., the aggregate drops impacting the rain detector in a period of time) generally produces a fixed acoustic signal on a specific rain-detecting device.

Figure 16:
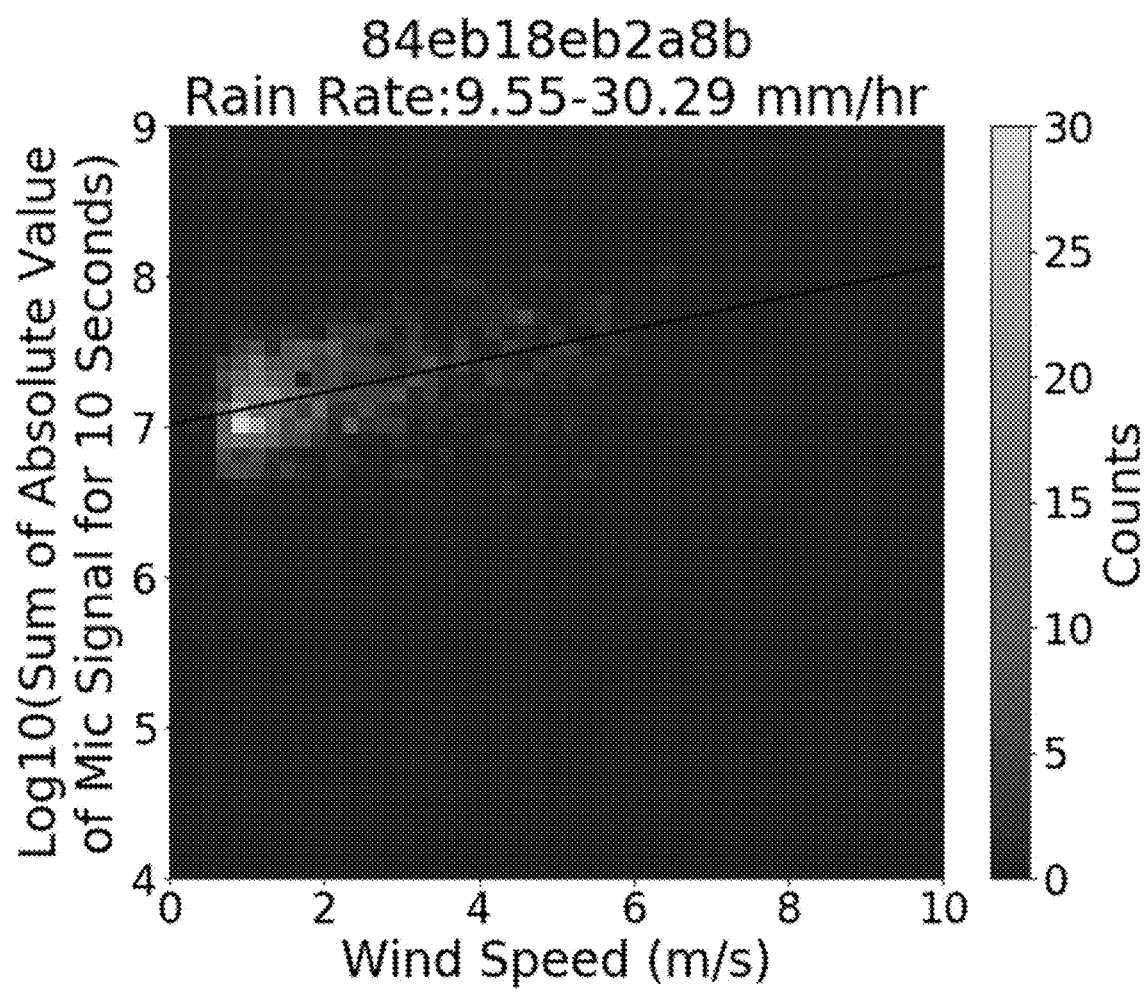
FIG. 16 is a plot of the logarithm (base 10) of the summed absolute value of transducer signal versus wind speed for an embodiment of a rain detection device as described herein.

In some embodiments, the acoustic signal in corrected for wind speed. Rain generally falls vertically in the absence of wind. However, the presence of wind adds a horizontal component to the rain velocity and in some instances increase the total velocity of rain drops in a volume of rain. Thus, the wind-increased velocity of rain drops can produce an artificially increased acoustic power detected by the rain detector for a given volume of rain (e.g. FIG. 16). Thus, correcting the acoustic power and/or rain rate and/or rain volume for wind improves the correlation of the measured signal (e.g., acoustic power or acoustic energy) with rain rate and/or rain volume.

In some embodiments, correcting the rain rate and/or rain volume for wind provides an acoustic power that is a proxy that is proportional to the rain rate and/or rain volume but that is also specific to the particular rain detecting device used to measure rain (e.g., due to nuances in the construction of each device).

Accordingly, embodiments provide methods for determining a calibration point for a rain sensing device so that the acoustic power measured by the rain sensing device correlates to the rain rate regardless of the individual device. During the development of embodiments of the technology described herein, experiments were conducted to test calibration methods. Data were collected indicating that a calibration based on rain drop size distribution provides a method to adjust rain measurements for any particular rain detection device produced as described herein.

Figure 17:
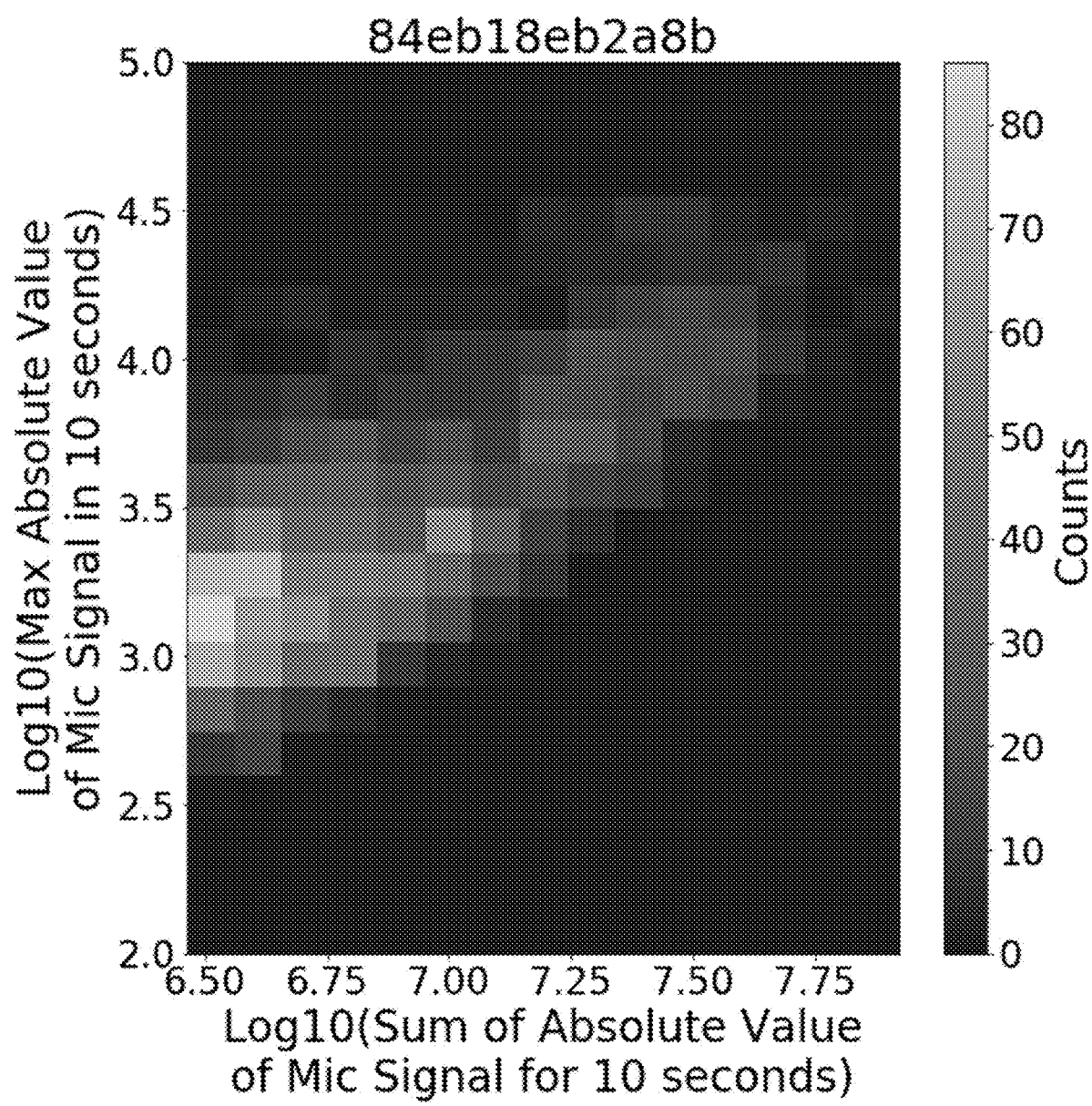
FIG. 17 is a plot of the logarithm (base 10) of the absolute value of the transducer signal over a 10-second time interval versus the logarithm (base 10) of the summed absolute value of the transducer signal over a 10-second time interval.

Raindrops are produced in a variety of sizes when water vapor condenses in the atmosphere. In particular, rain drops are generally between approximately 0.5 and 4.0 or 5.0 mm in diameter (e.g., a diameter of approximately 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 mm) at ground level even though raindrops outside of this range can be formed higher in the atmosphere. The reason for this phenomenon is two-fold: first, drops having a diameter less than approximately 0.5 mm (e.g., 0.3, 0.4, 0.5 mm) are held aloft by air currents and thus never reach the ground; second, drops having a diameter greater than approximately 4.0 or 5.0 mm assume a shape due to air friction that is unstable and thus drops having a diameter greater than 4.0 or 5.0 mm split into two or more drops having a smaller diameter. This maximum drop size of approximately 4.0 or 5.0 mm means that there is also a maximum transducer signal that is produced by a normal rain. As the rainfall in a time interval (the rain rate) increases, the maximum size of drops in the time interval also increases although most of the drops are much smaller than the maximum. Accordingly, the change in the drop size produces a proportional increase in the maximum of the signal detected by a rain detector provided herein and in the sum of the signal (see, e.g., FIG. 17).

At some point, the maximum drop size reaches approximately 4.0 or 5.0 mm in diameter and, as discussed above, the maximum drop size does not increase past approximately 4.0 or 5.0 mm in diameter. Accordingly, a plot of the signal maximum versus summed signal reaches a plateau. The point at which the vertical width of this plateau affects the vertical width of the drop size distribution represents a known rain rate. Thus, in some embodiments, the acoustic power at this plateau point is used as a normalization constant to transform acoustic power readings from an individual rain detector to the equivalent number of time intervals of known rain rate. In the plot shown in FIG. 17, the plateau point described above lies at a sum of approximately $10^{7.25}$ and represents a rain rate of approximately 30 mm per hour.

Figure 18A:
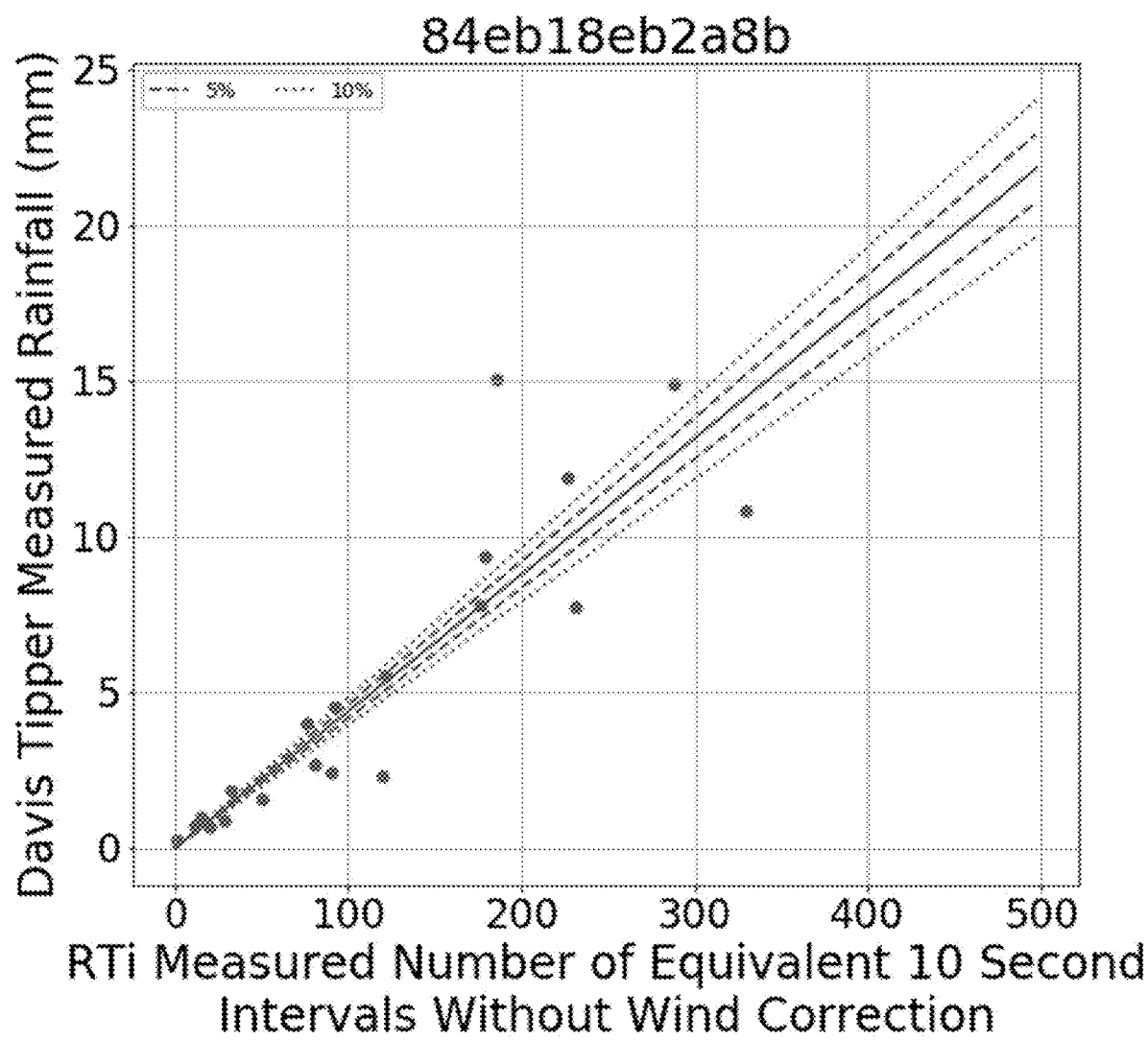
FIG. 18A is a plot of the rainfall for multiple different rain storms recorded with a particular rain detection device (84eb18eb2a8b) as a function of the number of 10 second intervals of this rainfall rate that the acoustic power represents as corrected for wind.
Figure 18B:
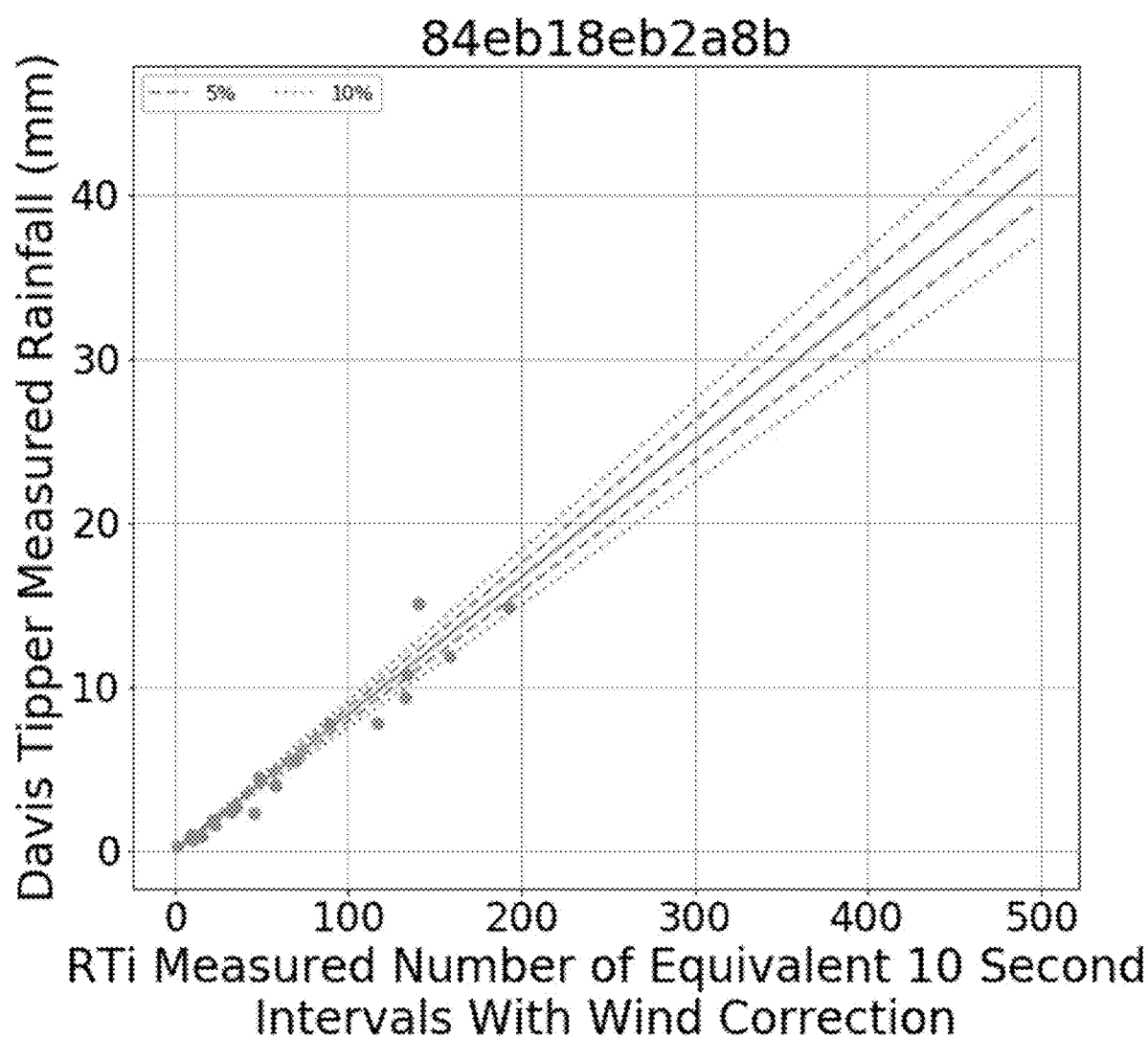
FIG. 18B is a plot of the rainfall for multiple different rain storms recorded with a particular rain detection device (84eb18eb2a8b) as a function of the number of 10 second intervals of this rainfall rate that the acoustic power represents as uncorrected for wind.

Next, in some embodiments, after the normalization constant described above is obtained, the acoustic power values are divided by the normalization constant to provide a number of equivalent time intervals of the known rain rate (see, e.g., FIG. 18A and FIG. 18B). The plots in FIG. 18A and FIG. 18B show the rainfall detected during multiple different storms using one particular rain detector (84eb18eb2a8b) as a function of the number of 10-second intervals of this rainfall rate that the acoustic power represents without wind correction (FIG. 18A) and with wind correction (FIG. 18B). The data in FIG. 18A and FIG. 18B are plotted against the rain measured by a tipping bucket rain measuring device.

Figure 19:
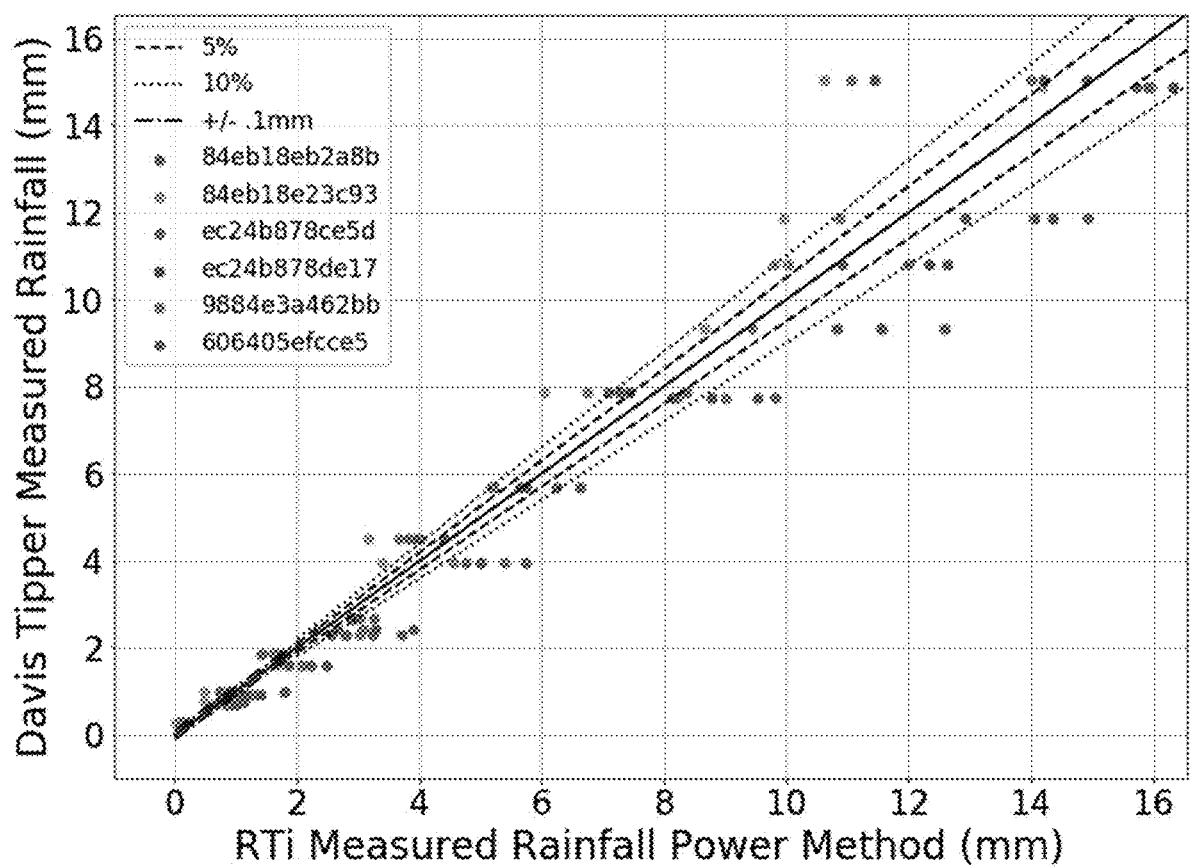
FIG. 19 is a plot of rainfall rate determined by six different rain detection devices as described herein versus rainfall rate determined by a co-localized tipping bucket measurement device.

Next, in some embodiments, methods comprise calculating a real rainfall rate from the number of equivalent time intervals of the fixed rain rate. In some embodiments, calculating real rainfall rate comprises multiplying the number of equivalent time intervals of the fixed rain rate by the amount of rain accumulated at the fixed rain rate in the time interval (in this example 30 [mm/hr]/360 [10 second intervals]=0.083). Data were collected from multiple rain detection devices (e.g., six different devices) during the development of the technology provided herein. Rain rates were determined for each device according to the methods described above and the data plotted against data collected by a co-located tipping bucket (FIG. 19).

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A sensing apparatus comprising:
   a) a hollow sonde that is spherical with a center and an internal surface;
   b) a stalk extending into the hollow sonde;
   c) a transducer mounted on the stalk; wherein the transducer is spaced from the internal surface and spaced from the center; and
   d) a gas or non-solid phase positioned between the transducer and the internal surface.

2. The sensing apparatus of claim 1 wherein said hollow sonde is made of stainless steel.

3. The sensing apparatus of claim 1 wherein the hollow sonde has a diameter of from 100 to 500 mm.

4. The sensing apparatus of claim 1 wherein the hollow sonde has a thickness of 0.5 to 5 mm thick.

5. The sensing apparatus of claim 1 wherein the hollow sonde has a characteristic frequency of 6 to 10 kHz.

6. The sensing apparatus of claim 1 wherein the transducer is an electret, piezo, or condenser microphone.

7. The sensing apparatus of claim 1 wherein the transducer is placed approximately 20 to 80 mm away from the center of the hollow sonde.

8. The sensing apparatus of claim 1 wherein the transducer detects sound waves that propagate from the hollow sonde to the transducer through the gas or non-solid phase positioned inside the hollow sonde.

9. The sensing apparatus of claim 1 wherein the transducer is placed approximately 25 to 75 mm away from the center of the hollow sonde.

10. The sensing apparatus of claim 1 wherein the hollow sonde comprises a limited rain-sampling area.

11. The sensing apparatus of claim 1 further comprising a solar radiance sensor.

12. A method of determining a rain rate, the method comprising:
    a) providing an apparatus according to claim 1;
    b) acquiring a real-time acoustic signal of rain drops impacting the hollow sonde of said apparatus;
    c) processing said real-time acoustic signal to produce acoustic power data or acoustic energy data; and
    d) determining a rain rate from the acoustic power data or acoustic energy data.

13. The method of claim 12 wherein determining a rain rate from the acoustic power data or acoustic energy data comprises producing a statistical parameter from a distribution of acoustic power data or acoustic energy data.

14. The method of claim 12 wherein processing said real-time acoustic signal comprises sampling an analog voltage to produce a digital time varying signal.

15. The method of claim 12 wherein processing said real-time acoustic signal comprises demodulating an amplitude modulated signal.

16. The method of claim 12 wherein processing said real-time acoustic signal comprises applying an envelope to the digital time varying signal.

17. The method of claim 12 wherein processing said real-time acoustic signal comprises downsampling the digital time varying signal.

18. The method of claim 12 wherein determining a rain rate from the acoustic power data or acoustic energy data comprises using a correlation between the aggregate signal of multiple droplet strikes and rain rate.

19. The method of claim 12 wherein determining a rain rate from the acoustic power data or acoustic energy data comprises using a power function to correlate between the aggregate signal of multiple droplet strikes and rain rate.

20. The method of claim 12 further comprising normalizing the acoustic power data and/or acoustic energy data using a normalization constant based on the maximum microphone signal detected in a normal rain.

21. The method of claim 20 wherein said normal rain has a maximum drop size of approximately 4.0 mm or 5.0 mm.

22. The method of claim 12 further comprising correcting the acoustic power data and/or acoustic energy data for wind velocity.

23. A system comprising a plurality of sensing apparatus according to claim 1.

* * * * *